Sept. 30, 1969   E. R. ALLER ET AL   3,469,888
RAILWAY CAR FOR TRANSPORTING PULVERULENT MATERIAL
Filed Aug 16, 1967   12 Sheets-Sheet 1
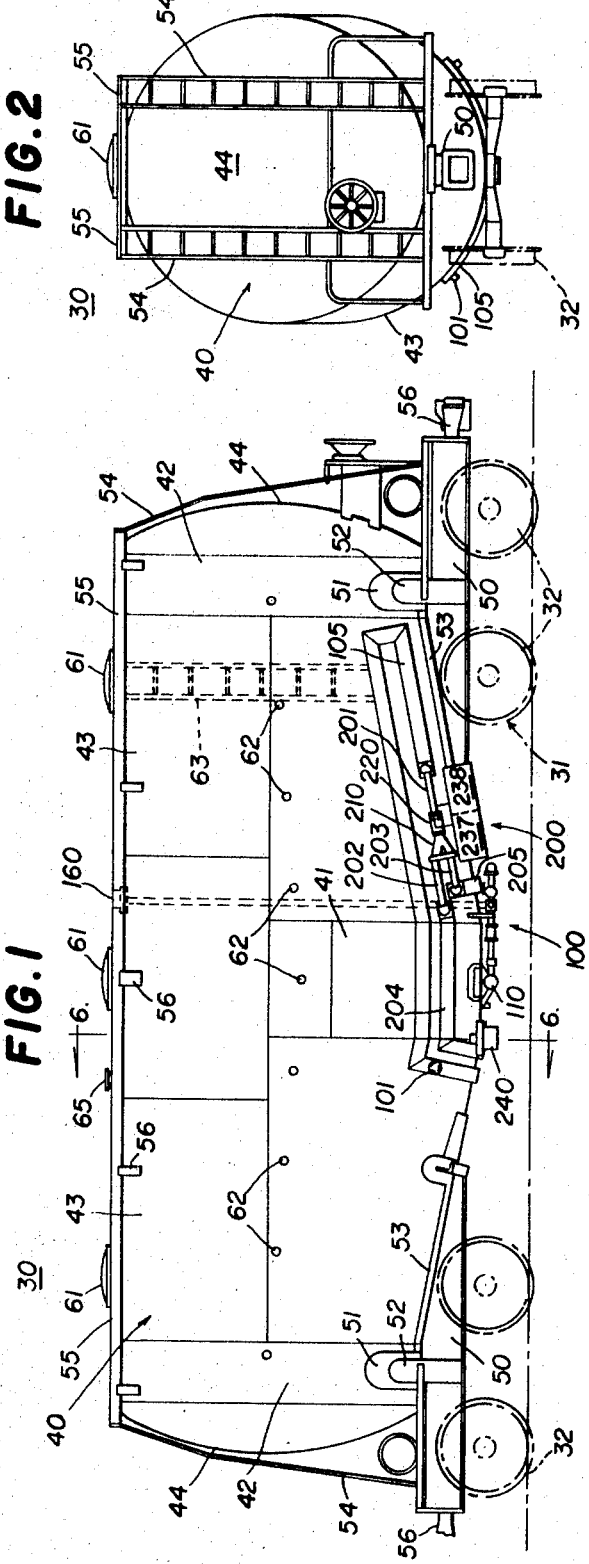
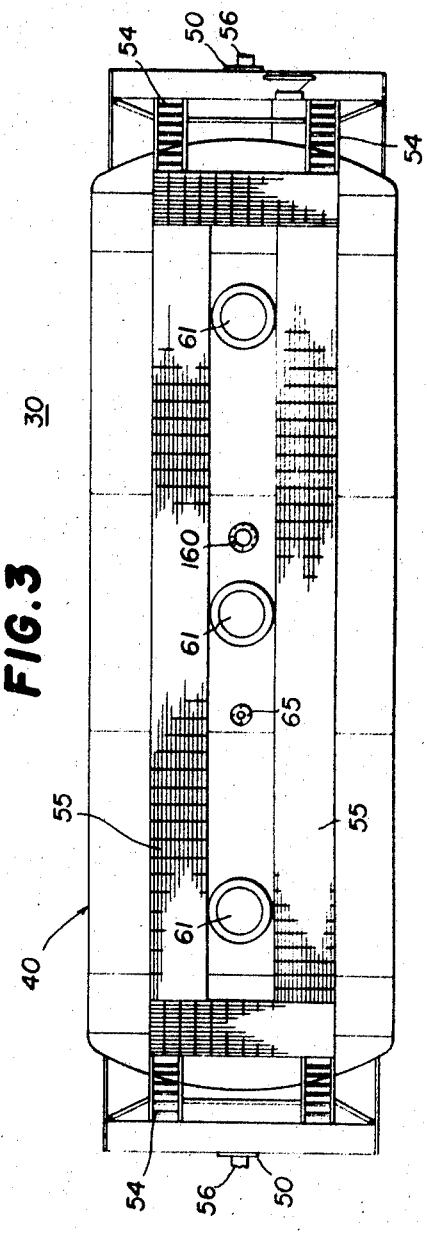
INVENTORS
EDMUND R. ALLER
PAUL E. SOLT
ATTYS.

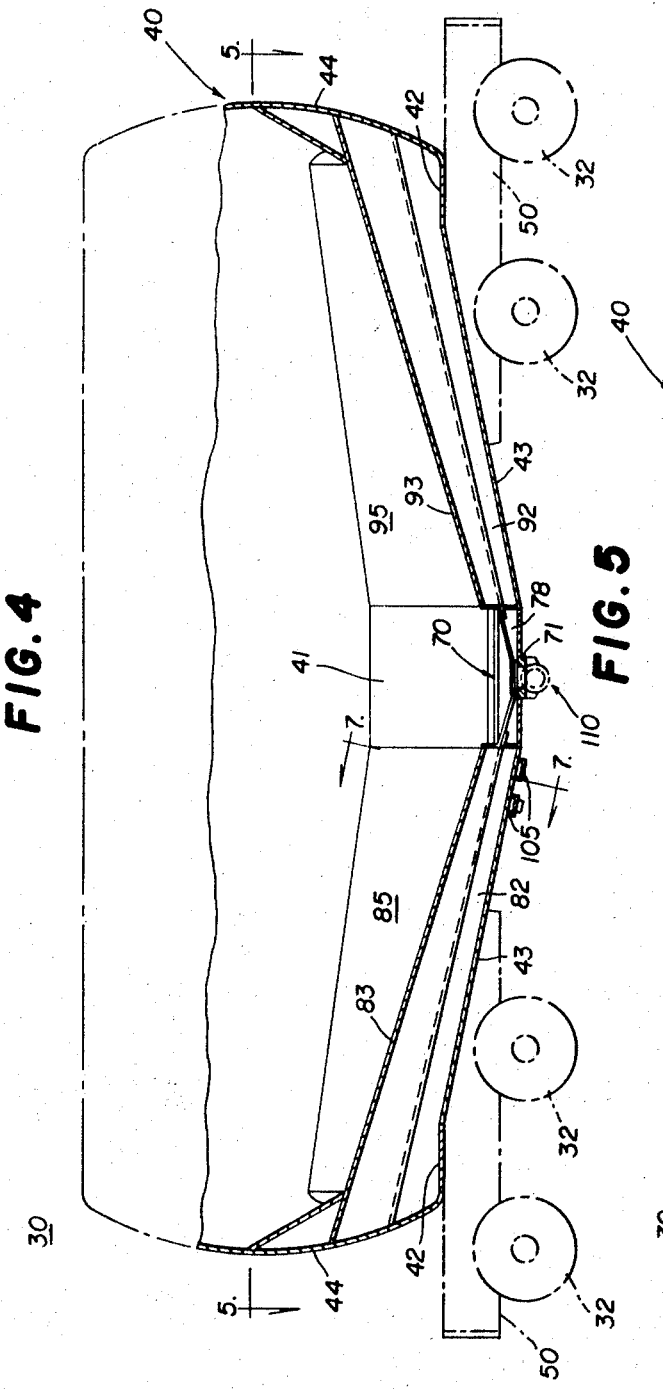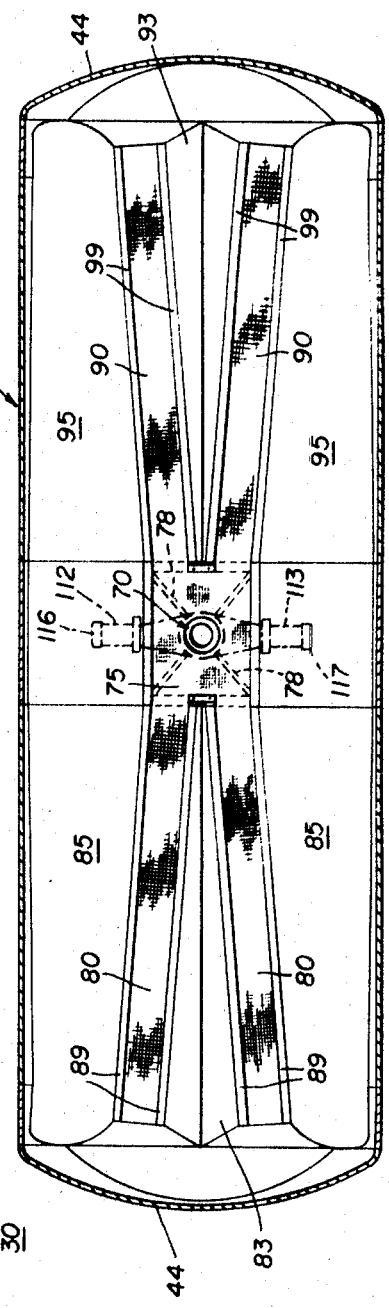

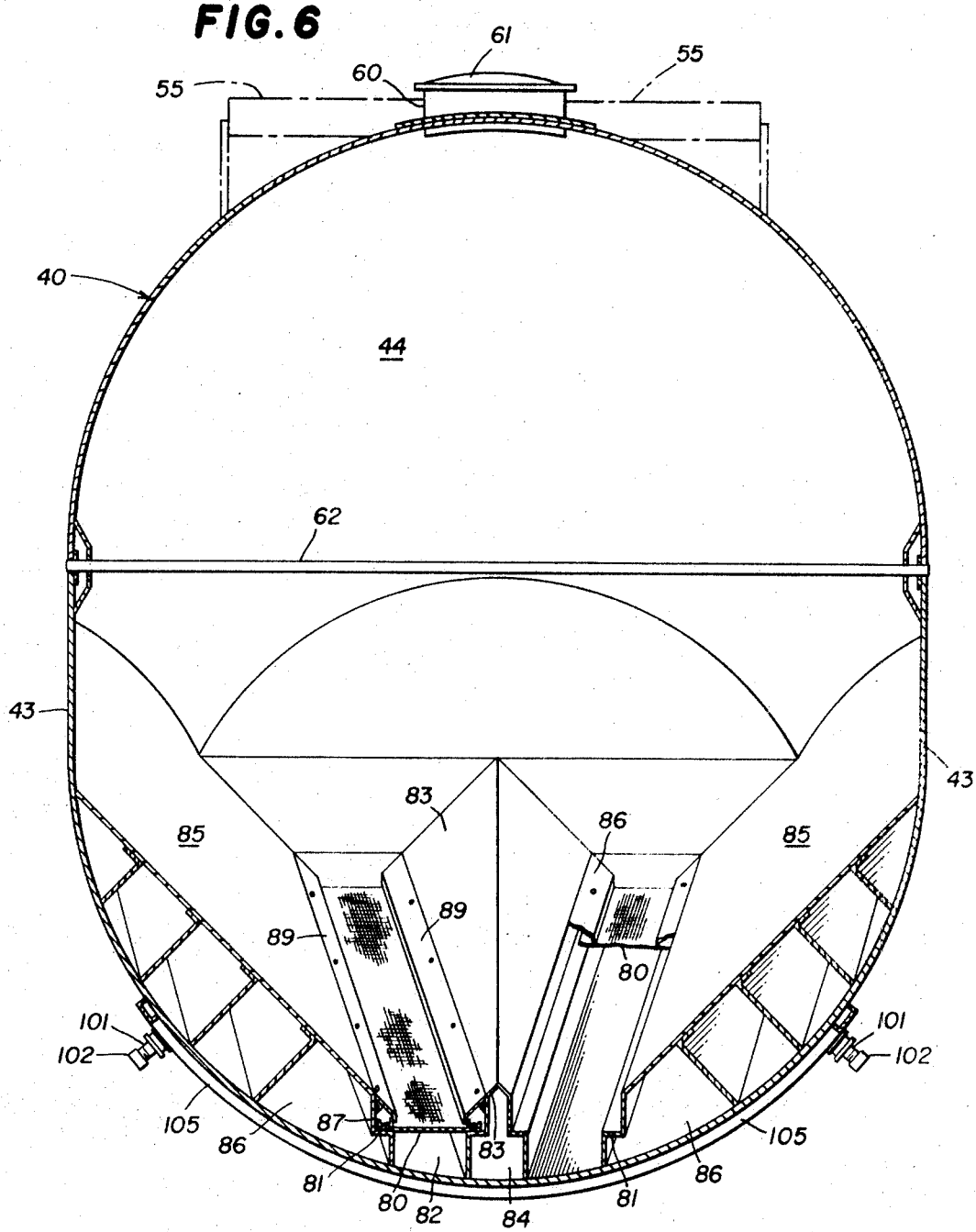

Sept. 30, 1969  E. R. ALLER ET AL  3,469,888
RAILWAY CAR FOR TRANSPORTING PULVERULENT MATERIAL
Filed Aug 16, 1967  12 Sheets-Sheet 4

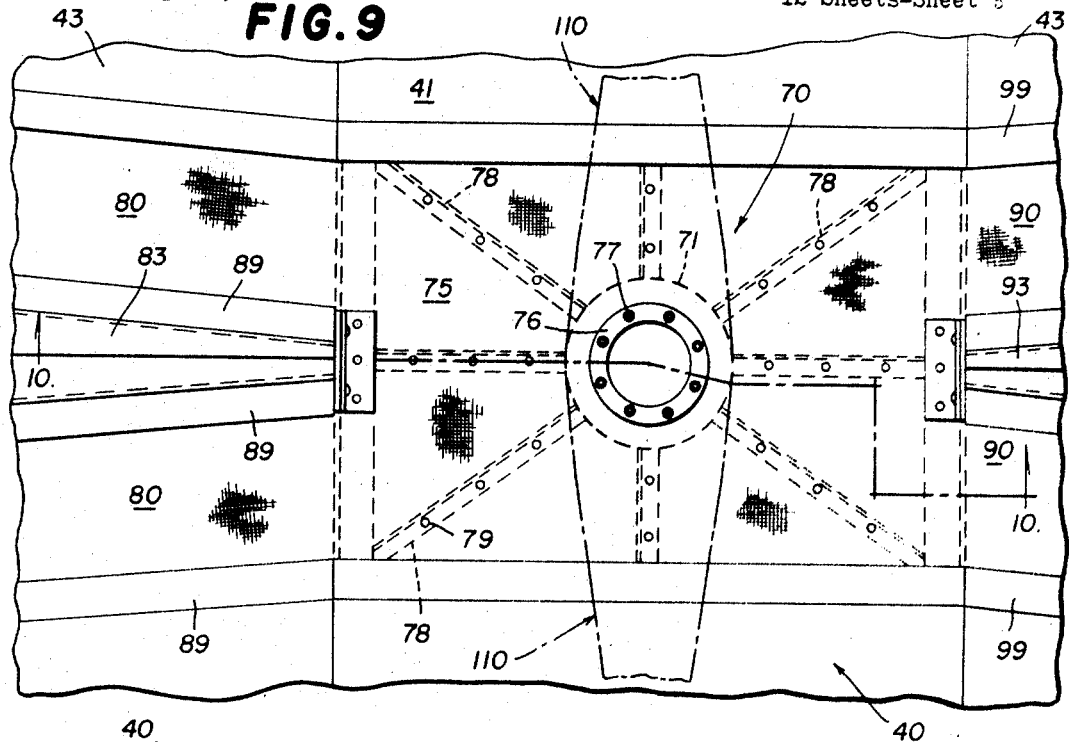
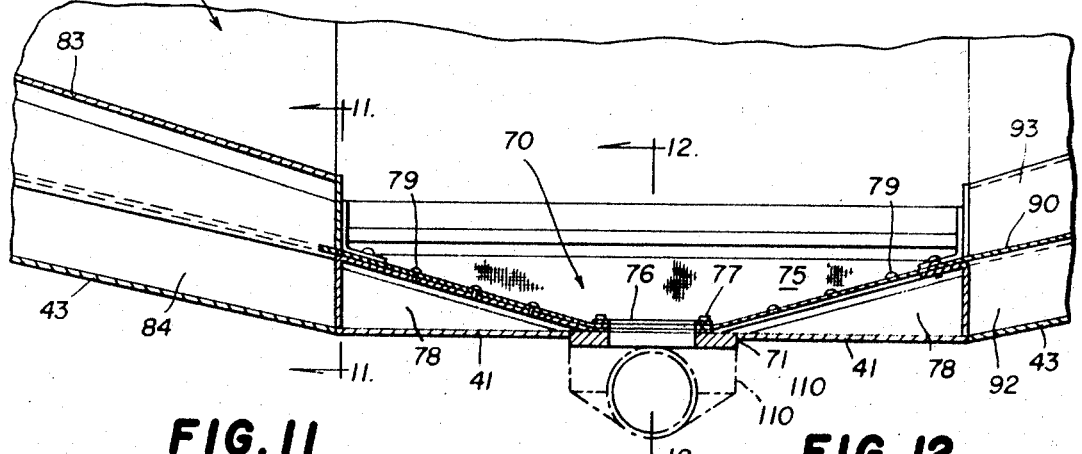
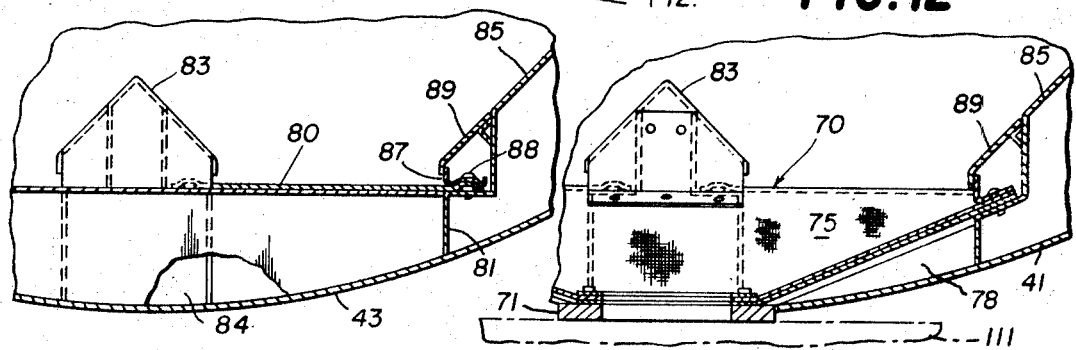

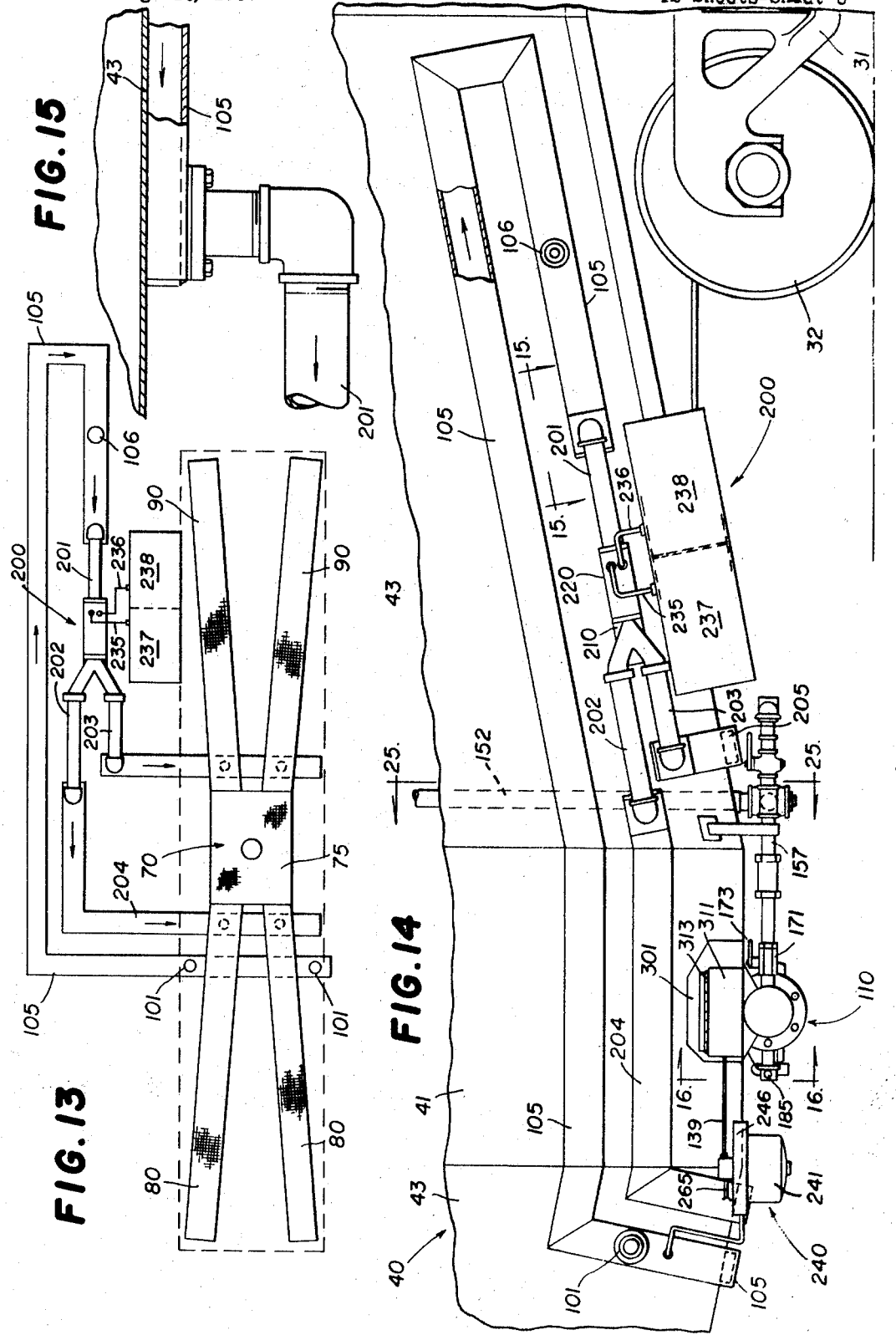

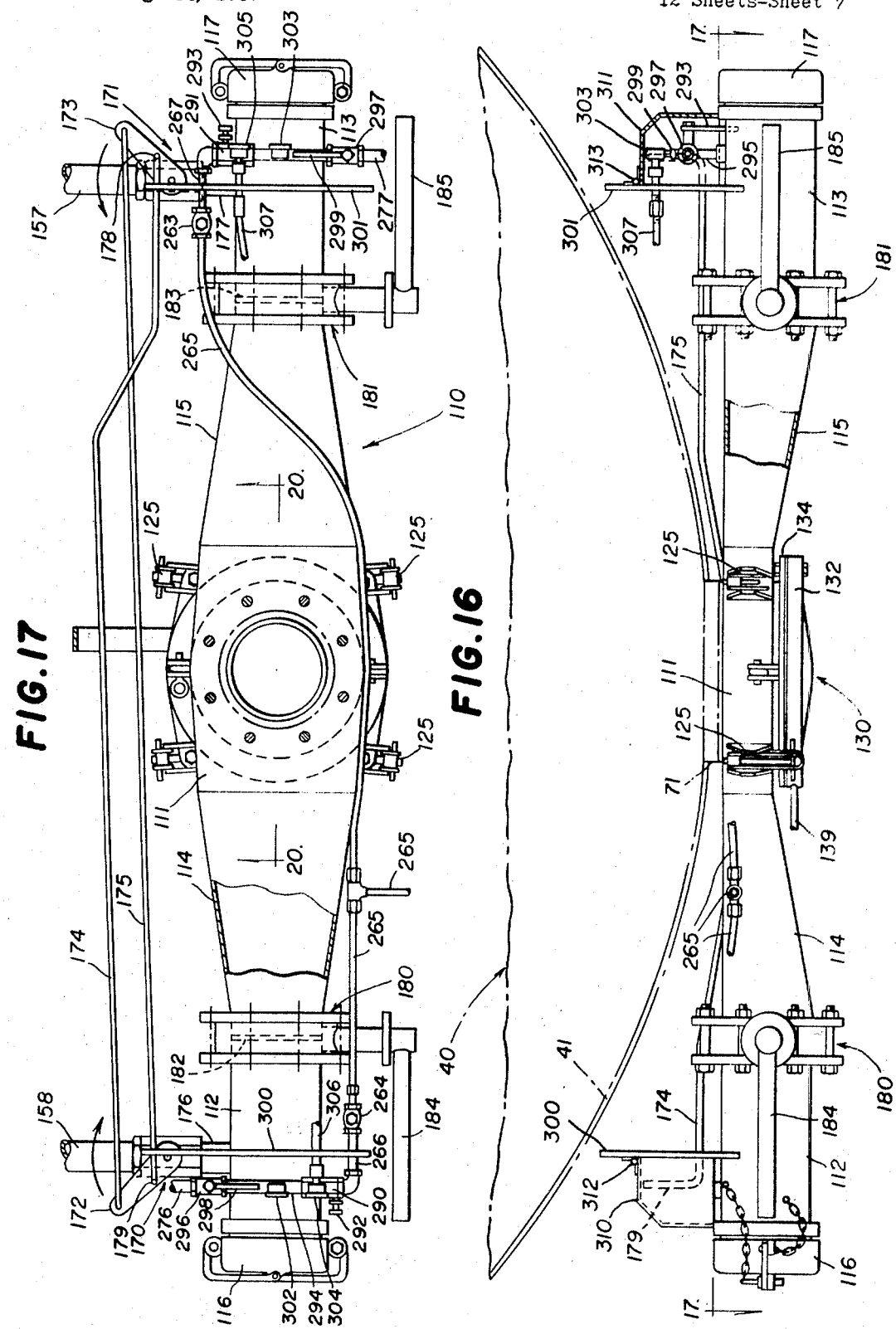

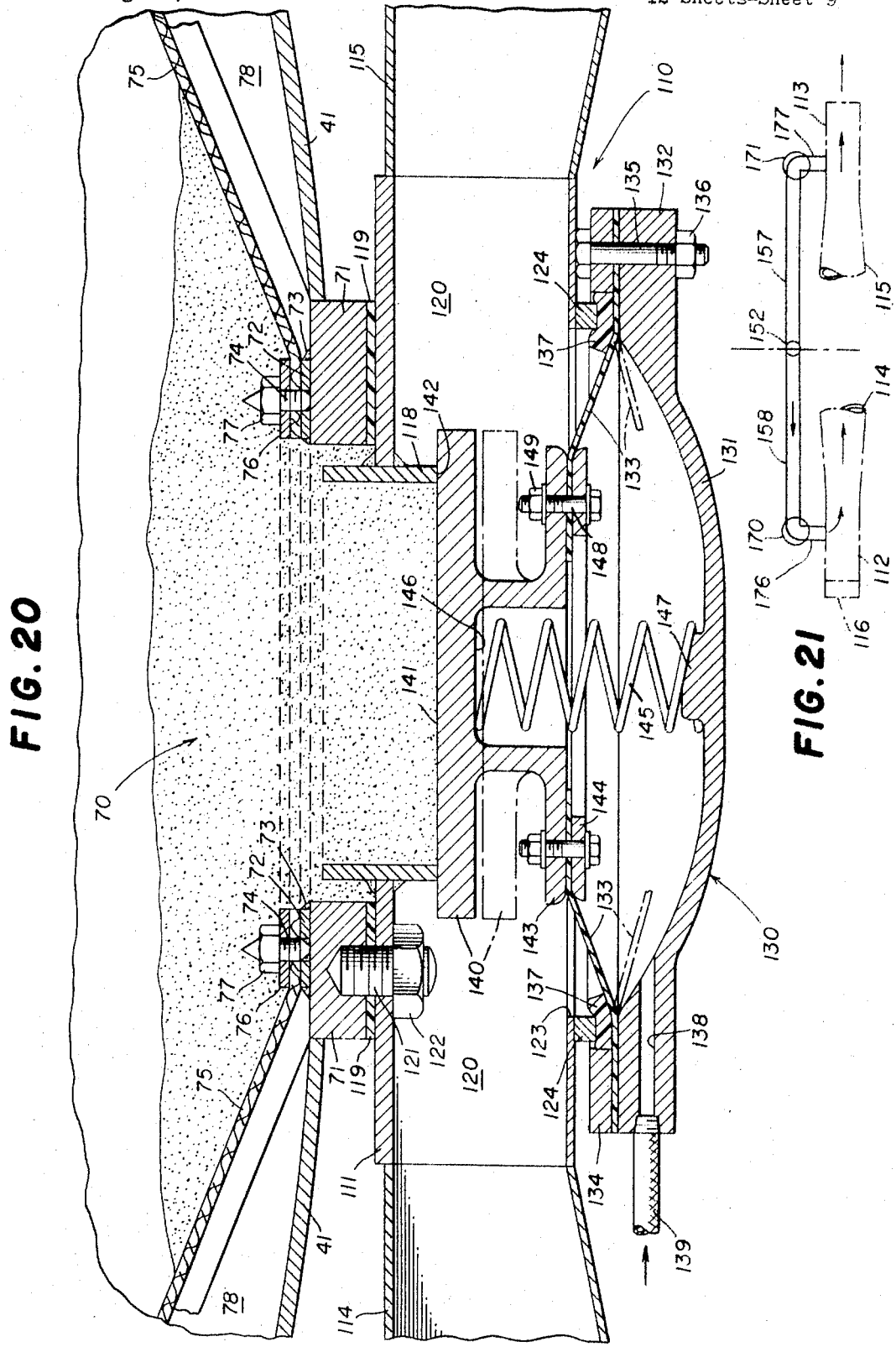

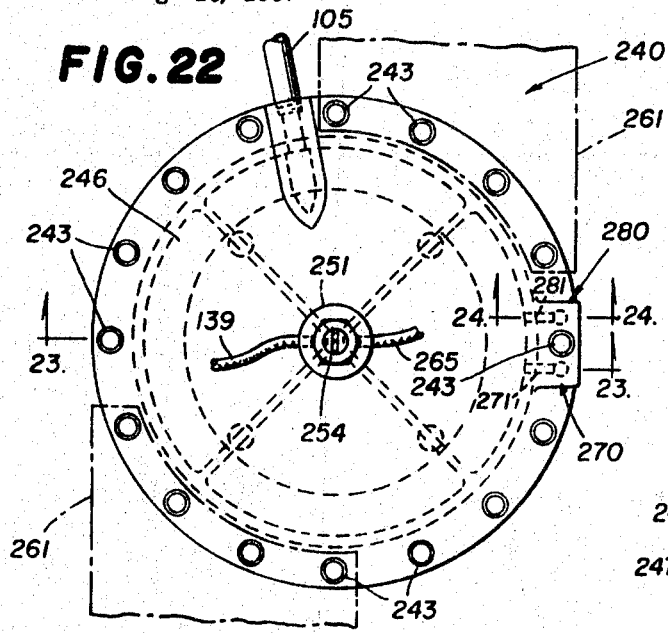
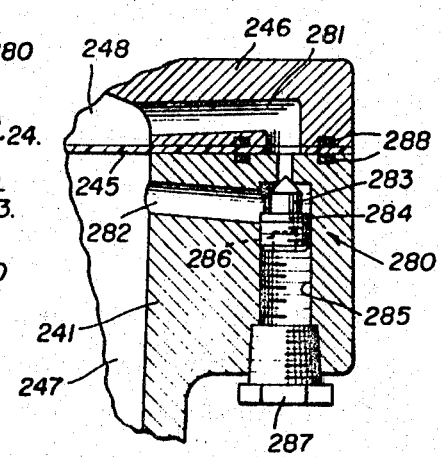
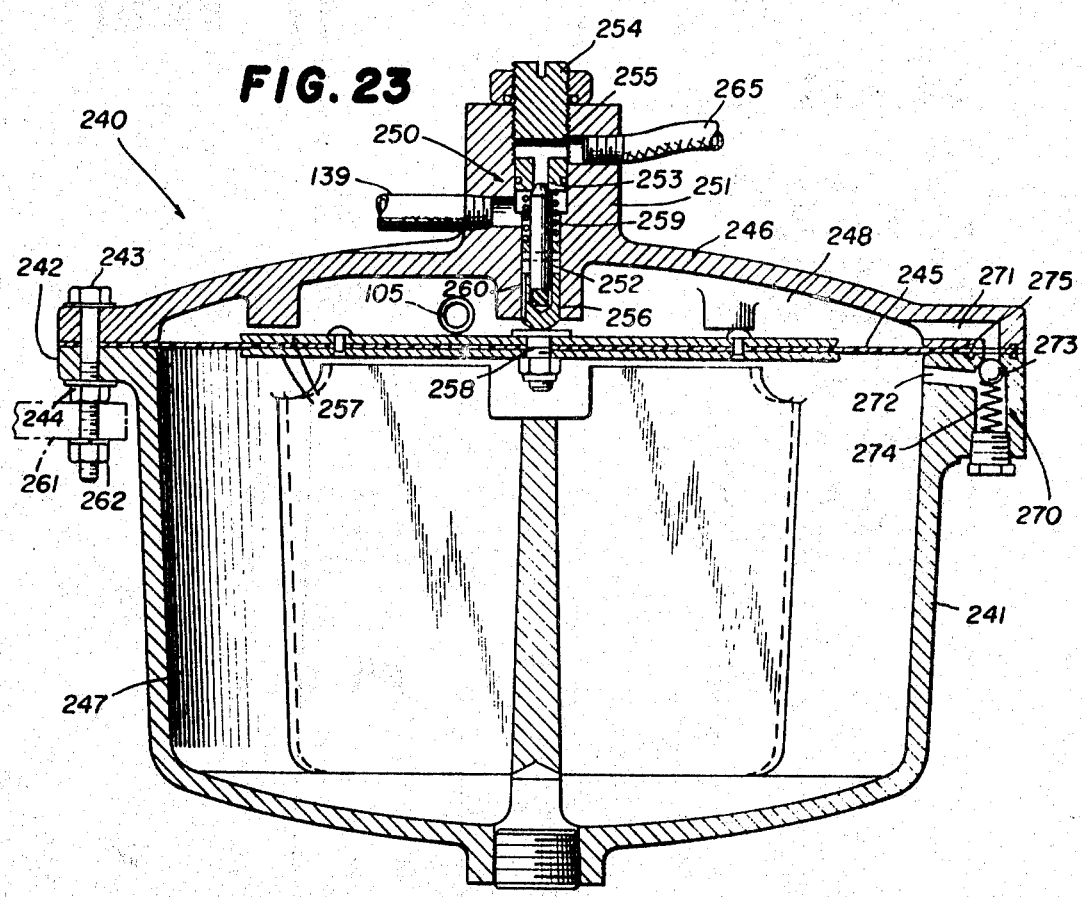

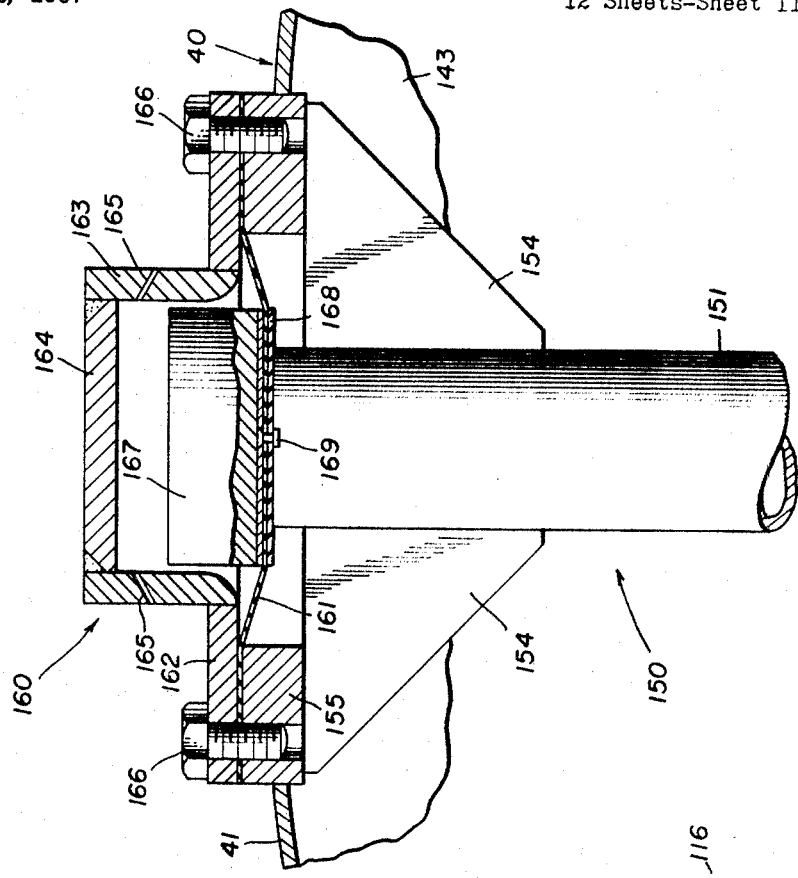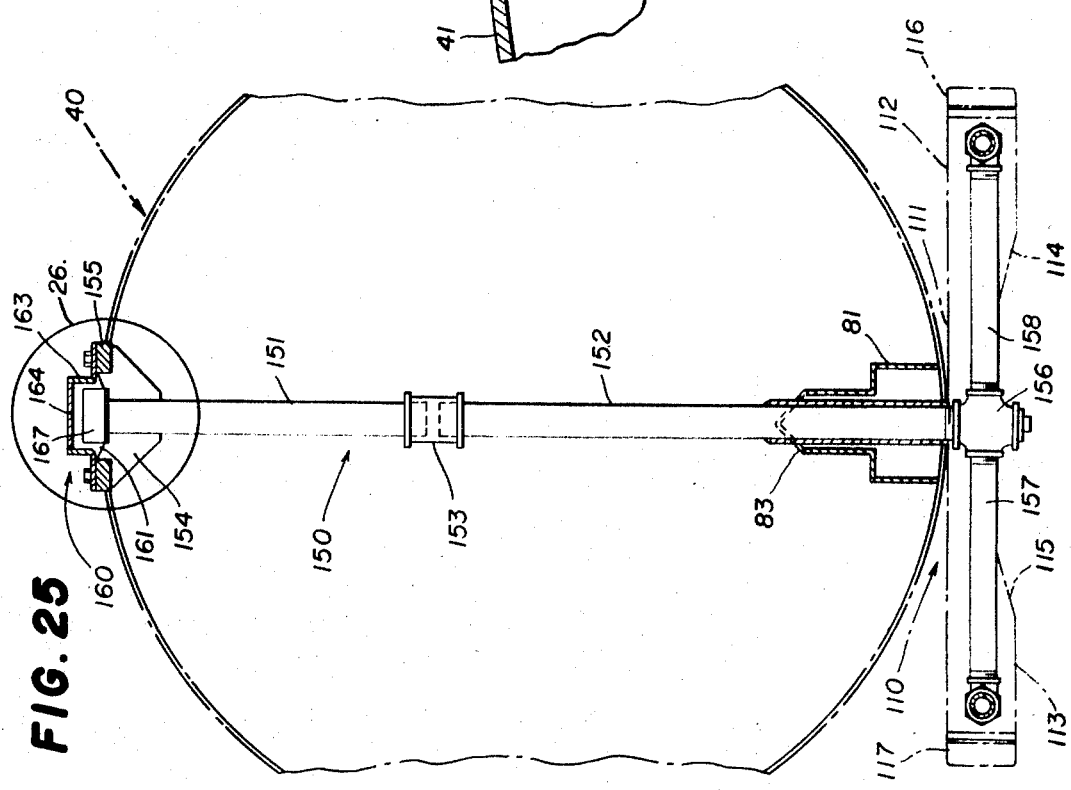

Sept. 30, 1969  E. R. ALLER ET AL  3,469,888

RAILWAY CAR FOR TRANSPORTING PULVERULENT MATERIAL

Filed Aug 16, 1967  12 Sheets-Sheet 12

United States Patent Office 3,469,888
Patented Sept. 30, 1969

3,469,888
RAILWAY CAR FOR TRANSPORTING
PULVERULENT MATERIAL
Edmund R. Aller, Portage, Ind., and Paul E. Solt, Catasauqua, Pa., assignors to General American Transportation Corporation, Chicago, Ill., a corporation of New York
Filed Aug. 16, 1967, Ser. No. 660,952
Int. Cl. B65g 53/40
U.S. Cl. 302—52
36 Claims

ABSTRACT OF THE DISCLOSURE

There is disclosed a railway car for transporting pulverulent lading including a fluid-tight lading container, means for pressurizing the container, structure defining two pairs of troughs leading into a sump in the lower portion of the container, means for alternately and abruptly aerating the pairs of troughs for fluidizing the lading and shaking the troughs to facilitate movement of the lading into the sump, discharge valve apparatus below the sump for pneumatically unloading the container and a control device for automatically closing the discharge valve apparatus in response to a sudden pressure drop in the container.

The present invention relates to a railway car comprising a container defining a fluidized storage chamber adapted to receive pulverulent material lading such as cement, cereal flour, etc., and a pneumatic system of improved construction and arrangement for unloading the pulverulent material from the storage chamber.

It is a general object of the invention to provide in a railway car of the character noted, a container defining a fluid-tight storage chamber adapted to receive a pulverulent material, means accommodating the loading of the pulverulent material into the storage chamber, means defining a sump in the bottom of the container and communicating with the storage chamber, structure defining an elongated trough in the bottom of the container, the trough having an open top communicating with the bottom of the storage chamber, the trough occupying an inclined position in the bottom of the container and extending from a lower position disposed adjacent to the sump to an upper position disposed remote from the sump, the lower end of the trough communicating with the sump, an elongated porous element closing the bottom of the trough and contacting the adjacent portion of the pulverulent material therein, the structure also defining an elongated plenum chamber disposed below the trough and communicating with the element, a passage adapted to contain air under superatmospheric pressure, valve mechanism connecting the plenum chamber to the pipe and having open and closed positions, control means for cyclically operating the valve mechanism alternately between its two positions, whereby the supply of air under superatmospheric pressure into the plenum chamber from the pipe is initiated by operation of the valve mechanism into its open position and is arrested by operation of the valve mechanism into its closed position, and whereby the air under superatmospheric pressure supplied into the plenum chamber penetrates the porous element and passes into the fluid chamber and also fluidizes the adjacent portion of the pulverulent material in the bottom of the trough causing the fluidized pulverulent material to feed downwardly along the element into the sump, the control means being characterized by rapid operation of the valve mechanism from its closed position into its open position, whereby the supply of air under superatmospheric pressure from the pipe into the plenum chamber is initiated abruptly causing a high velocity shock wave to travel through the plenum chamber with the consequent vibration of the porous element and the resulting shaking of the adjacent portion of the pulverulent material in the bottom of the trough, and means for unloading to the exterior of the container the pulverulent material fed into the sump.

Another object of the invention is to provide a container of the type set forth wherein a pair of substantially parallel troughs extend upwardly and away from the sump, the valve mechanism rapidly operating into both the closed and open positions thereof so that abrupt initiation and abrupt arresting of the air supply to the plenum chambers is effected with the consequent vibration of the porous elements and the resulting shaking of the pulverulent material in the bottoms of the troughs.

Another object of the invention is to provide in a container of the type set forth two troughs extending upwardly from the sump in opposite directions toward the opposite ends of the container, a switching valve connected to the air source and having two outlets respectively connected to the two plenum chambers associated with the two troughs, the switching valve having a first position connecting its inlet to a first of its outlets and disconnecting its inlet from a second of is outlets and having a second position connecting its inlet to its second outlet and disconnecting its inlet from its first outlet, whereby operation of the switching valve into its first position initiates the supply of air under superatmospheric pressure from the air source into the first plenum chamber and arrests the supply of air under superatmospheric pressure from the air source into the second plenum chamber, and operation of the switching valve into its second position initiates the supply of air under superatmospheric pressure from the air source into the second plenum chamber and arrests the supply of air under superatmospheric pressure from the air source into the first plenum chamber, and an oscillating valve for switching the switching valve alternately between its first position and its second position.

Another object of the invention is to provide in a container of the type set forth, a conduit for containing air under superatmospheric pressure and connected to the storage chamber, an improved discharge valve arranged below the container adjacent to the sump and comprising structure defining an entrainment chamber and an inlet passage from the sump into the entrainment chamber and an outlet passage from the entrainment chamber to the exterior, the discharge valve also including a valve element cooperating with the inlet passage and having open and closed positions with respect thereto, the weight of the pulverulent material in the sump and the pressure of the air in the storage chamber normally biasing the valve element into its open position, whereby the pulverulent material may pass from the sump through the inlet passage with the valve element in its open position into the entrainment chamber, a pipe connecting the storage chamber to the entrainment chamber, a valve device arranged in the pipe having open and closed positions, whereby the air from the storage chamber may pass through the pipe with the valve device in its open position into the entrainment chamber so as to effect entrainment of the pulverulent material therein and may then blow through the outlet passage in order to effect pneumatic unloading of the pulverulent material from the storage chamber, a control device connected to the conduit and including a member having normal and control positions, the control device also including means responsive to a rapid rate of drop in the pressure of the air in the conduit for operating the member rapidly from a normal position into its control position, the air in the conduit being subject to a rapid rate of drop in pressure incident to unloading of substantially all of the pulverulent material from the storage chamber as a consequence of the initial rush of the air from the storage chamber through the inlet passage with the valve element in its open position, and means governed by rapid operation of the member into its control position for rapidly operating the valve element into its closed position so as to prevent rapid discharge of the air under substantial pressure from the storage chamber via the inlet passage and through the outlet passage incident to unloading of substantially all of the pulverulent material from the storage chamber.

A further object of the invention is to provide a container of the type set forth having a laterally extending discharge tube arranged therebelow and in communication with the sump, a pair of closure caps respectively removably carried by the opposite ends of the tube, structure providing a passage between the midsection of the tube and the sump, a valve device arranged in the midsection of the tube and cooperating with the passage to open and to close the same, whereby the pulverulent material in the container may be unloaded therefrom through the sump and the passage into the midsection of the tube with the valve device in its open position and then blown by the air under superatmospheric pressure through either open end of the tube with the corresponding one of the closure caps in its open condition.

Further features of the invention pertain to the particular arrangement of the elements of the railway car and of the pneumatic unloading system therefor, whereby the above-outlined and additional operating features thereof are attained.

The invention, both as to its organization and method of operation, together with further objects and advantages thereof, will best be understood by reference to the following specification, taken in connection with the following drawings, in which:

FIGURE 1 is a side elevational view of a railway car comprising an elongated longitudinally extending body shell defining a fluid-tight enclosure and adapted to receive a pulverulent lading and incorporating a pneumatic system for unloading the same and embodying the present invention;

FIG. 2 is an end elevational view of the railway car, as shown in FIG. 1;

FIG. 3 is a plan view of the railway car, as shown in FIGS. 1 and 2;

FIG. 4 is an enlarged fragmentary side elevational view of the railway car body, similar to FIG. 1, and illustrating certain interior structural details thereof;

FIG. 5 is an enlarged longitudinal sectional view of the railway car body, this view being taken in the direction of the arrows along the line 5—5 in FIG. 4;

FIG. 6 is a further enlarged lateral sectional view of the railway car body, this view being taken in the direction of the arrows along the line 6—6 in FIG. 1;

FIG. 9 is a greatly enlarged fragmentary plan view of the central portion of the railway car body, as shown in FIG. 5;

FIG. 10 is a greatly enlarged fragmentary longitudinal sectional view of the central portion of the railway car body, this view being taken in the direction of the arrows along the line 10—10 in FIG. 9;

FIG. 11 is a greatly enlarged fragmentary lateral view of the central portion of the railway car body, this view being taken in the direction of the arrows along the line 11—11 in FIG. 10;

FIG. 12 is a greatly enlarged fragmentary lateral sectional view of the central portion of the railway car body, similar to FIG. 11, this view being taken in the direction of the arrows along the line 12—12 in FIG. 10;

FIG. 13 is a diagrammatic plan view of the system for supplying air under pressure into the railway car body, as shown in FIGS. 1 to 3, inclusive;

FIG. 14 is an enlarged fragmentary side elevational view of the central portion of the railway car body, as shown in FIG. 1, and illustrating in some detail the air pressure supply system, as shown in FIG. 13;

FIG. 15 is a greatly enlarged longitudinal sectional view of an element of the air pressure supply system, this view being taken in the direction of the arrows along the line 15—15 in FIG. 14;

FIG. 16 is a greatly enlarged lateral sectional view of the railway car body and a side elevational view of the lading discharge nozzle assembly that is carried by the lower central portion of the railway car body, this view being taken in the direction of the arrows 16—16 in FIG. 14;

FIG. 17 is a greatly enlarged plan view of the lading discharge nozzle assembly, this view being taken in the direction of the arrows along the line 17—17 in FIG. 16;

FIG. 20 is a greatly enlarged lateral sectional view of the central portion of the railway car body, illustrating a modulating valve incorporated in the pneumatic unloading system for the railway car body, this view being taken in the direction of the arrows along the line 20—20 in FIG. 17;

FIG. 21 is a fragentary schematic illustration of another portion of the pneumatic unloading system for the railway car body;

FIG. 22 is a greatly enlarged plan view of a blow-down rate control valve that is incorporated in the pneumatic unloading system for the railway car body;

FIG. 23 is a further enlarged vertical sectional view of the blow-down rate control valve, this view being taken in the direction of the arrows along the line 23—23 in FIG. 22;

FIG. 24 is a still further enlarged fragmentary vertical sectional view of a constructional detail of the blow-down rate control valve, this view being taken in the direction of the arrows along the line 24—24 in FIG. 22;

FIG. 25 is an enlarged lateral sectional view of the central portion of the railway car, illustrating the jet air supply system for the discharge assembly, this view being taken in the direction of the arrows along the line 25—25 in FIG. 14;

FIG. 26 is a greatly enlarged fragmentary side elevational view, partly in section of a pressure regulating valve incorporated in the jet air supply system, as shown in the area 26 in FIG. 25;

Figures 7, 8:
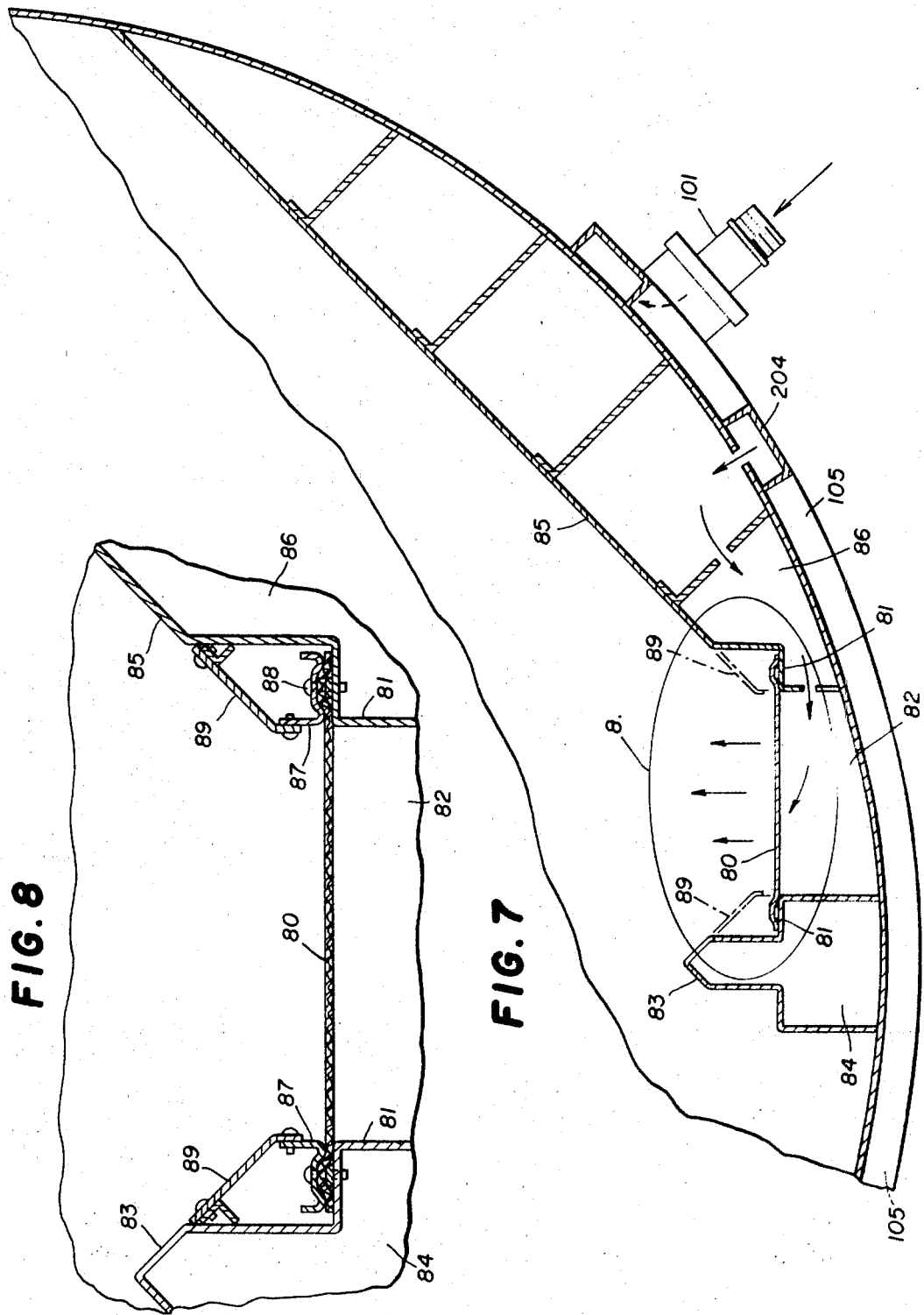
FIG. 7 is a greatly enlarged fragmentary lateral sectional view of the railway car body, this view being taken in the direction of the arrows along the line 7—7 in FIG. 4.
FIG. 8 is a greatly enlarged fragmentary lateral sectional view of the central portion of the railway car body, as shown in the area 8 in FIG. 7.
Figure 18:
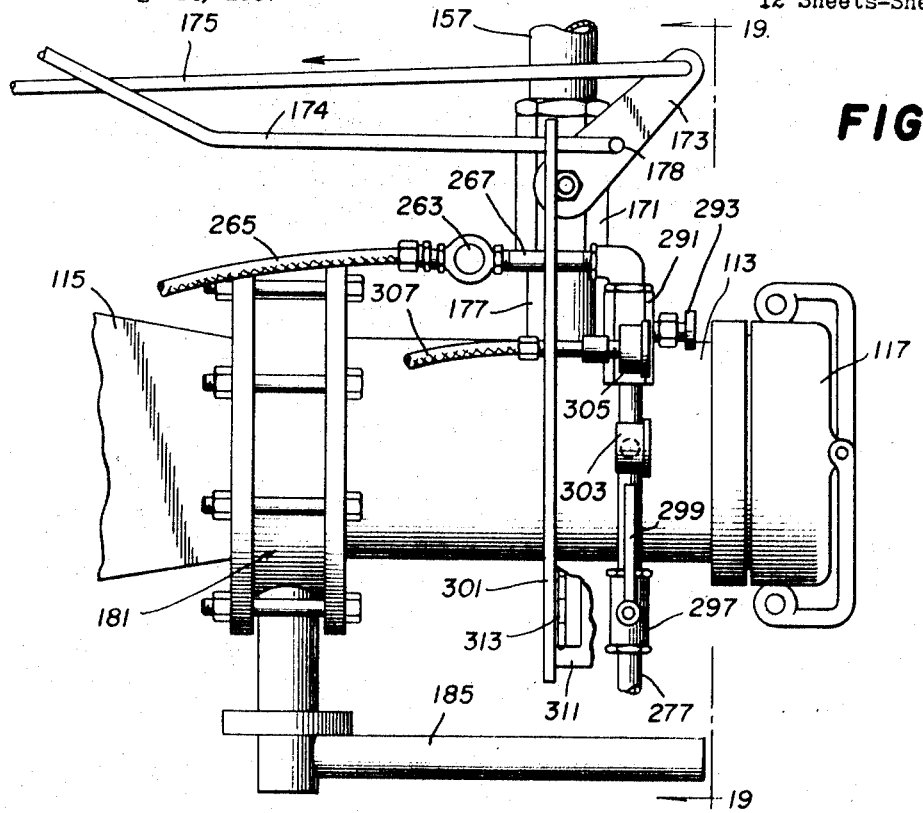
FIG. 18 is a greatly enlarged plan view of the right-hand end of the lading discharge nozzle assembly, as shown in FIG. 17.
Figure 19:
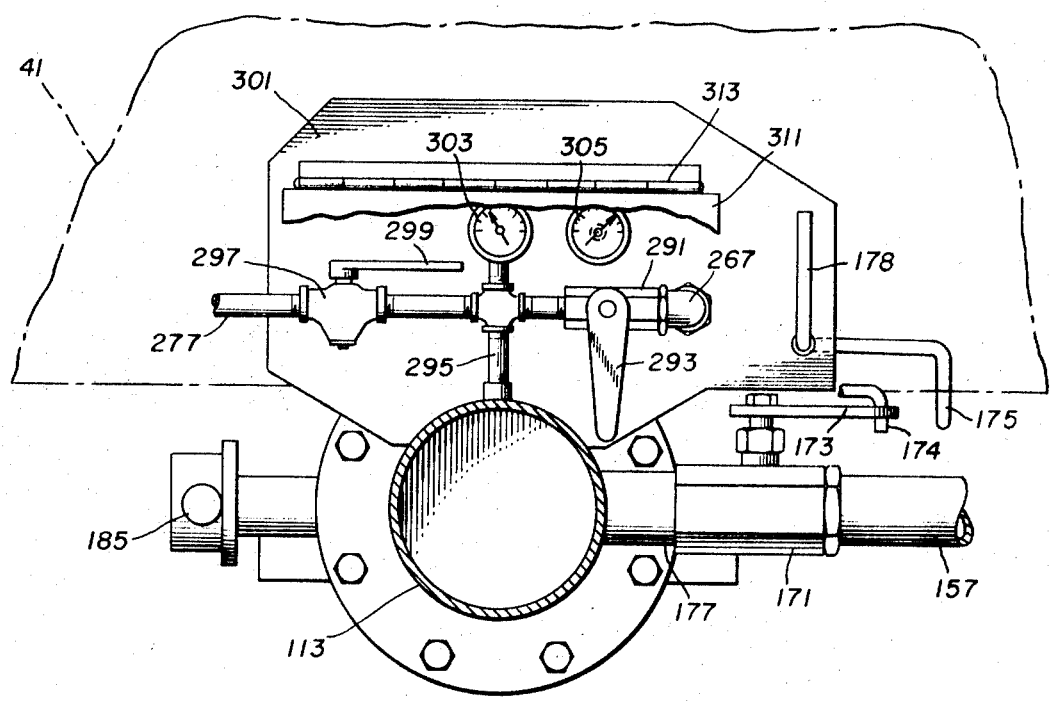
FIG. 19 is a greatly enlarged end elevational view, partly in section, of the right-hand end of the lading discharge nozzle assembly, this view being taken in the direction of the arrows along the line 19—19 in FIG. 18.
Figure 27:
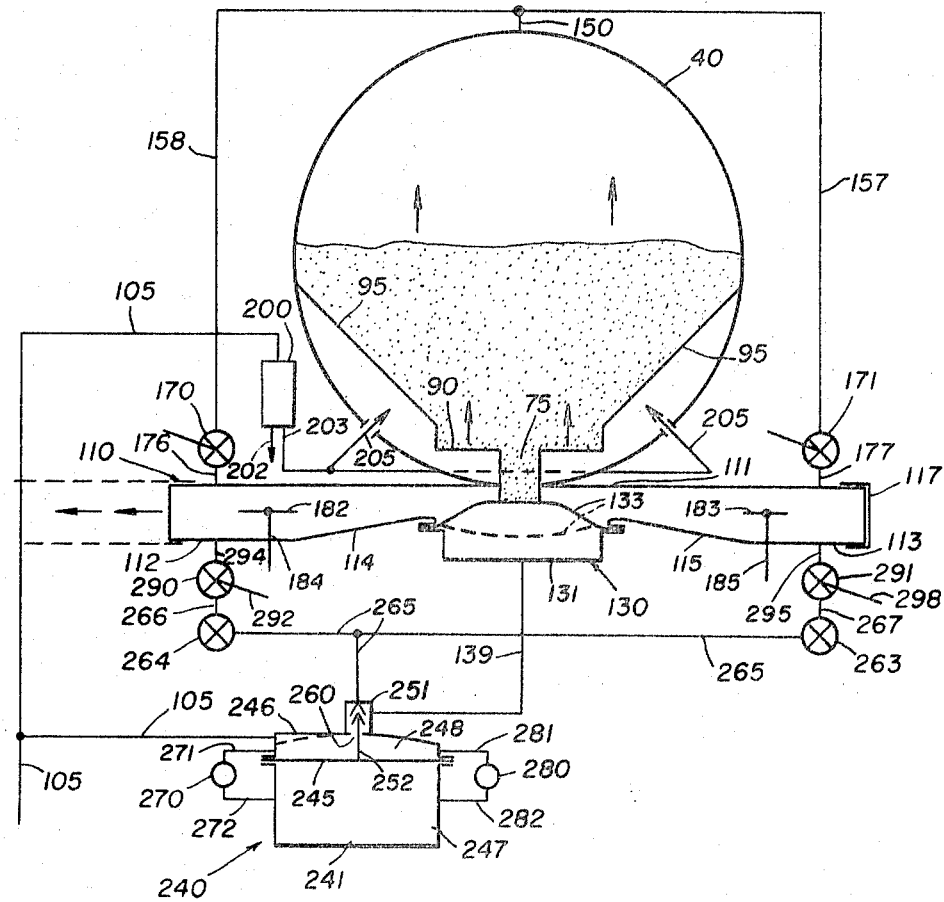
Figure 28:
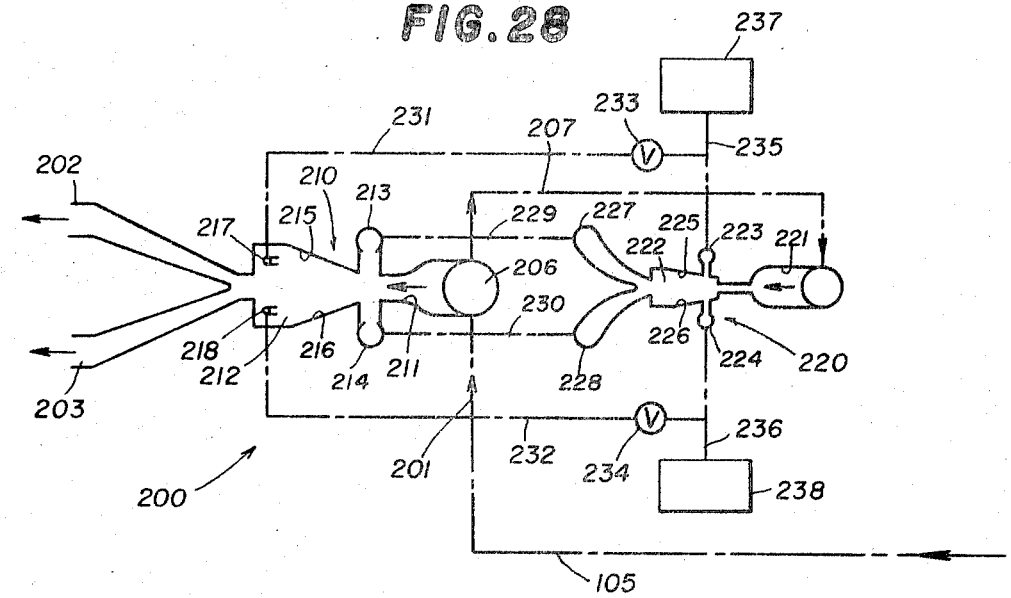

FIG. 27 is a diagrammatic lateral sectional view of the railway tank car body of FIG. 1, illustrating schematically the cooperation between the blow-down rate control valve and the modulating valve incorporated in the pneumatic unloading system; and FIG. 28 is a diagrammatic illustration of the high-pressure air supply system for the railway car body, indicating the cooperation between an oscillating valve and a diverting or switching valve incorporated therein.

Referring now to FIGS. 1 to 3, inclusive, of the drawings, there is illustrated a vehicle in the form of a railway car 30 that comprises an elongated longitudinally extending body shell 40 defining a fluid-tight enclosure and adapted to receive a pulverulent material lading, such as cement, cereal flour, etc., and embodying the features of the present invention. The body shell 40 is mounted upon a pair of trucks 31 that are in turn supported by sets of wheels 32, all in the usual manner. The body shell 40 further is of strong rigid self-supporting construction, including a short substantially elliptical central section 41, a pair of substantially cylindrical end sections 42, a pair of transition sections 43 interconnecting each end section 42 and the adjacent end of the central section 41, and a pair of end headers 44. More particularly, the outer ends of the central section 41 are respectively rigidly secured as by welding, to the adjacent inner ends of the transition sections 43; and the outer ends of the transition sections 43 are respectively rigidly secured, as by welding, to the adjacent inner ends of the end rigid section 42; and the outer ends of the end sections 42 are respectively rigidly secured, as by welding, to the adjacent inner open ends of the end headers 44. When so constructed and connected, the upper portions of the various sections 41, 42 and 43 all lie in a common horizontal top plane, the lowermost portion of the central section 41 is disposed in a bottom plane, the bottommost portions of the end sections 42 are disposed in a plane intermediate the top and botttom planes and the bottom of the transition sections 43 slope upwardly from the bottom plane to the intermediate plane mentioned, whereby the body shell 40 is of the so-called "fish-belly" construction.

A pair of short stiff stub draft sills 50 are respectively arranged below the central outer end portions of the end sections 42 and disposed in longitudinal alignment with each other and respectively rigidly secured in place, so that the total draft and buff forces that are applied between the stub draft sills 50 are transmitted directly through the body shell 40, and without the provision of an underframe in the railway car 30. Each of the stub draft sills 50 is rigidly secured in place by respective structures, each including a saddle plate 51, a body bolster 52, and an intervening pedestal 53. Specifically, the saddle plate 51 is semi-cylindrical and is arranged in direct engagement and embracing relation with the outer end portion of the adjacent end section 42 and rigidly secured in place as by welding; and the inner end of the stub draft sill 50 is disposed in engagement with the adjacent saddle plate 51 and rigidly secured thereto, as by welding. The body bolster 52 is disposed on the stub draft sill 50 and extends laterally on either side thereof and is rigidly secured thereto, as by welding; and the pedestal 53 is arranged between the saddle plate 51 and the body bolster 52 and rigidly secured thereto as by welding. Thus, it will be understood that the inner end of the stub draft sill 50, the adjacent saddle plate 51, the adjacent body bolter 52, and the adjacent pedestal 53 comprise a unitary rigid fabricated construction that is, in turn, rigidly secured to the adjacent outer end portion of the adjacent end section 42. The outer end of the stub draft sill 50 is hollow and receives the usual draft gear 56, and the body bolster 52 is arranged to receive the usual center pin, not shown, for the purpose of accomplishing the usual articulated connection of the body bolster 52 to the trunk bolster (not shown) of the adjacent truck 31; whereby the opposite ends of the body shell 40 are supported through the respectively adjacent pair of body bolsters 52 by the respectively adjacent pair of trucks 31, in the usual manner.

Continuing the reference to FIGS. 1, 2 and 3, the opposite end headers 44 each carry a pair of upstanding ladders 54, each of the ladders 54 extending from the adjacent stub draft sill 50 to the top of the adjacent end header 44; and a pair of elongated longitudinally extending catwalks 55 are arranged on the top of the body shell 40 longitudinally thereof and spaced-apart. The opposite ends of each of the catwalks 55 respectively terminate adjacent to the tops of two of the ladders 54, so as to accommodate the passage of a trainman from end-to-end of the railway car 30 in a convenient manner. Intermediate portions of the catwalks 55 may be suitably supported upon adjacent upper portions of the body shell 40 employing brackets 56 extending therebetween, as is best illustrated in FIG. 1. The catwalks 55 may be of any suitable construction, and as illustrated are formed of open-grating structure.

Three manway structures 60 are carried by the body shell 40 and arranged between the catwalks 55, the manway structure 60 being arranged in longitudinal alignment. More specifically, each of the manway structures 60 is disposed generally centrally and longitudinally of the body shell 40 with the central manway structure 60 disposed at the center of the car and with the other manway structures 60 disposed adjacent to the respective end headers 44 and communicating with the adjacent top end portion of the lading compartment defined within the body shell 40; each of the manway structures 60 is provided with a removable cover 61 that is normally arranged in fluid-tight closing relation therewith.

In order to preserve the shape of the several sections of the body shell 40 when heavy loads of lading, hereinafter referred to for convenience as cement, are disposed therein, a plurality of stay rods 62 are provided along the length of the body shell 40 extending between the opposite sides thereof and disposed substantially horizontally, see particularly FIGS. 1 and 6. For convenience in checking the interior of the railway car 30, the righthand manway cover 61 disposed to the right in FIG. 1 has mounted therebeneath and interiorly of the body shell 40 a ladder 63, the ladder 63 extending downwardly from the manway cover 61 to substantially the bottom of the body shell 40 to facilitate the entry and exit of the workmen. Finally, a safety vent 65 has been provided which is operative to relieve excess pressures which may be encountered during the loading and unloading of the railway car 30.

Referring now to FIGS. 4, 5, 9 to 12, 13 and 20, the lower central portion of the central section 41 is provided therein with a sump generally designated by the numeral 70; more specifically, there is an opening provided in the bottom of the central section 41 in which opening is suitably secured an annular supporting ring 71 as by welding. Mounted on the upper surface of the supporting ring 71 is a mounting ring 72 also annular in shape and secured to the supporting ring 71 as by welding at 73 and carrying thereon a plurality of upstanding threaded studs 74 essentially equidistantly spaced therearound. Completely surrounding the supporting ring 71 and extending outwardly and upwardly therefrom is a sheet 75 of porous fabric which serves to direct cement toward the opening defined by the supporting ring 71. The central portion of the sheet 75 has a circular opening therein and the periphery thereof is clamped upon the mounting ring 72 by means of a clamping ring 76, the sheet 75 and the clamping ring 76 having aligned openings therethrough that receive the threaded studs 74 therein, nuts 77 being provided engaging the studs 74 clampingly to hold the periphery of the fabric sheet 75 in position on the mounting ring 72. A plurality of support brackets 78 are provided extending radially outwardly from the mounting ring 72 to hold the fabric sheet 75 in an upwardly inclined position, the outer periphery of the fabric sheet 75 being clamped in a generally rectangular configuration, see FIG. 9, by a clamping bracket extending around the periphery thereof. In addition a plurality of rivets 79 is provided to connect intermediate portions of the fabric sheet 75 to the support brackets 78 at spaced-apart points therealong.

Referring now specifically to FIGS. 4 to 12 of the drawings, it will be seen that two substantially rectangular fabric sheets 80 extend upwardly from the sump 70 toward one end of the body shell 40 and also diverge one from the other, and it will be seen that two substantially rectangular fabric sheets 90 extend upwardly from the sump 70 toward the other end of the body shell 40 and also diverge one from the other. The fabric sheets 80 are each supported on a pair of elongated longitudinally extending and laterally spaced-apart structures 81, referred to as "footings," provided in the lower portion of the body shell 40 on one side of the sump 70; which footings 81 define air chambers 82 therebelow. An elongated longitudinally extending structure 83, referred to as a "cricket" is disposed in the central bottom portion of the body shell 40 and extends from the sump 70 to the adjacent end of the body shell 40. The cricket 83 is directly supported upon the adjacent inner portions of the footings 81; and the cricket 83 defines an air chamber 84 therebelow that commonly communicates with the air chamber 82. Also, a pair of elongated longitudinally extending and laterally spaced-apart structures 85, referred to as "slope sheets," are arranged in the lower portion of the body shell 40 and positioned on the outer sides of the respective footings 81; which slope sheets 85 respectively define air chambers 86 therebelow that respectively communicate with the adjacent air chambers 84. Thus the air chambers 82, 84 and 86 commonly communicate with each other and constitute a first common plenum chamber for a purpose more fully explained below. The air chambers 82 communicate with the lading chamber disposed thereabove through the sheets 80, the sheets 80 preventing the cement container in the body shell 40 from falling into the respective air chambers 82, to serve another purpose more fully developed hereinafter.

The fabric sheets 80 are more specifically connected around the periphery thereof to the underlying supports by a plurality of clamping brackets 87 held in place by bolts and nuts generally designated 88, and there further is provided at the juncture between the periphery of the fabric sheets 80 and the support structure therefor a shield 89 to prevent cement or other lading from being trapped at the juncture between the periphery of the fabric sheets 80 and the various support structures therefor.

In view of the foregoing, it will be understood that the cricket 83 cooperates with the slope sheets 85 to define two laterally spaced-apart troughs disposed on the lefthand side of the sump 70, as viewed in FIG. 5, that slope both laterally inwardly from the respective slope sheets 85 and longitudinally downwardly toward the sump 70, the surfaces of the sheets 80 being inclined at an angle of about 13° with respect to the horizontal longitudinal axis of the railway car 30.

Referring again specifically to FIGS. 4 to 12 of the drawings, the fabric sheets 90 are each supported on a pair of elongated longitudinally extending and laterally spaced-apart structures, referred to as "footings" (not shown but identical to the footings 81), provided in the lower portion of the body shell 40 on one side of the sump 70; which footings define air chambers 92 therebelow. An elongated longitudinally extending structure 93, referred to as a "cricket" is disposed in the central bottom portion of the body shell 40 and extends from the sump 70 to the adjacent end of the body shell 40. The cricket 93 is directly supported upon the adjacent inner portions of the footings 91; and the cricket 93 defines and air chamber (not shown but identical to the air chamber 84) therebelow that commonly communicates with the air chamber 92. Also, a pair of elongated longitudinally extending and laterally spaced-apart structures 95, referred to as "slope sheets," are arranged in the lower portion of the body shell 40 and positioned on the outer sides of the respective footings; which slope sheets 95 respectively define air chambers (not shown but identical to the air chambers 86) therebelow that respectively communicate with the adjacent air chamber below the cricket 93. Thus the air chambers 92, and the air chambers below the cricket 93 and the slope sheets 95 commonly communicate with each other and constitute a second common plenum chamber for a purpose more fully explained below. The air chambers 92 communicate with the lading chamber disposed thereabove through the sheets 90, the sheets 90 preventing the cement contained in the body shell 40 from falling into the respective air chambers 92, to serve another purpose more fully developed hereinafter.

The fabric sheets 90 are more specifically connected around the periphery thereof to the underlying supports by a plurality of clamping brackets (not shown but identical to the clamping brackets 87) held in place by bolts and nuts (not shown but identical to the bolts and nuts 88), and there further is provided at the juncture between the periphery of the fabric sheets 90 and the support structure therefor a shield 99 to prevent cement or other lading from being trapped at the juncture between the periphery of the fabric sheets 90 and the various support structures therefor.

In view of the foregoing, it will be understood that the cricket 93 cooperates with the slope sheets 95 to define two laterally spaced-apart troughs disposed on the righthand side of the sump 70, as viewed in FIG. 5, that slope both laterally inwardly from the respective slope sheets 95 and longitudinally downwardly toward the sump 70, the surfaces of the sheets 90 being inclined at an angle of about 13° with respect to the horizontal longitudinal axis of the railway car 30.

There has been provided for the railway car 30 a pneumatic unloading apparatus generally designated by the numeral 100 and carried on the body shell 40 on the lower generally central portion thereof. The pneumatic unloading apparatus 100 includes a pair of air intakes or supply nozzles 101 disposed on the opposite sides of the body shell 40 (see FIGS. 1, 6 and 14) provided with caps 102 and communicating with an air inlet channel or manifold 105, the inlet channel 105 providing a source of high pressure air at a superatmospheric pressure in the general range of 15 p.s.i.g. to 45 p.s.i.g., it being understood that the supply nozzles 101 are adapted to be connected to a source of such air at the unloading station for the railway car 30. For safety purposes, a relief valve 106 has been provided in the manifold 105 (see FIG. 14) to relieve any overpressure in the manifold 105.

The cement, or other lading within the railway car 30, is discharged therefrom through the bottom thereof and specifically through a discharge tube 110, as best illustrated in FIGS. 1, 5 and 16 to 20, inclusive. The discharge tube 110 extends laterally of the body shell 40 below the central section 41 thereof and includes a central section 111 that is essentially rectangular in plan view and in cross section, a pair of end sections 112 and 113 that are both essentially cylindrical in shape and circular in cross section, and a pair of transition sections 114 and 115 that interconnect the central section 111 and the respective adjacent end sections 112 and 113. As may be best seen in FIG. 5, the outer ends of the end sections 112 and 113 are disposed well inwardly with respect to the longitudinally extending sides of the body shell 40, and closure caps 116 and 117 respectively are provided on the outer end of the end sections 112 and 113 to close the same. The connection between the discharge tube 110 and the body shell 40 is best illustrated in FIG. 20 wherein it will be seen that the central section 111 of the discharge tube 110 has a circular opening in the upper wall thereof through which extends a discharge pipe 118 that is also suitably secured thereto as by welding, the outer diameter of the discharge pipe 118 being slightly less than the inner diameter of the opening in the supporting ring 71, whereby the upper end of the discharge pipe 118 extends upwardly and into the opening in the supporting ring 71 and thus is in communication with the sump 70 in the bottom of the body shell 40. In order firmly to secure the discharge tube 110 to the body shell 40 in a fluid-tight manner, an annular gasket 119 is provided between the lower surface of the supporting ring 71 and the upper surface of the central section 111, a plurality of studs 121 threadedly engaging complementarily shaped and threaded openings in the supporting ring 71 and extending downwardly therefrom and through aligned openings in the gasket 119 and the top wall of the central section 111, the lower ends of the studs 121 receiving nuts 122 that serve to hold the parts in the assembled position illustrated in FIG. 20.

That portion of the discharge tube 110 adjacent to the discharge pipe 118 and generally confined within the central section 111 defines an entrainment chamber 120 where lading falling from the sump 70 into the discharge tube 110 is picked up by a stream of air flowing through the discharge tube 110, whereby the lading is conveyed to a distant point such as a storage bin for deposit and storage. The passage of cement or other lading from the sump 70 into the entrainment chamber 120 is under the control of a discharge or modulating valve 130 mounted on the discharge tube 110 and acting therein. The lower wall of the central section 111 of the discharge tube 110 has a circular opening 123 therein which is reinforced on the underside by a ring 124 suitably secured thereto as by welding. The discharge valve 130 essentially acts through the opening 123 and includes a housing 131 in the form of an inverted dome provided with an outwardly directed and laterally extending annular flange 132 having a diameter substantially greater than the diameter of the ring 124. Mounted on the upper side of the housing 131 is a flexible diaphragm 133, which diaphragm 133 may be formed of a suitable plastic sheet material, such as neoprene. The outer periphery of the diaphragm 133 is clamped to the upper side of the housing 131 by means of a mounting ring 134, the mounting 134 and the flange 132 having aligned openings therethrough and the periphery of the diaphragm 133 having aligned openings therethrough which receive bolts 135 with cooperating nuts 136 that serve firmly to clamp the periphery of the diaphragm 133 between the flange 132 and the mounting ring 134. Disposed within the inner diameter of the mounting ring 134 and resting upon the diaphragm 133 is a gasket 137 which bears against the ring 124, a plurality of clamps 125 acting between the body shell 40 and the valve housing 131 serving to clamp the parts in the assembled position illustrated best in FIG. 20. The housing 131 further has a passage 138 therein that extends from the chamber defined between the housing 131 and the diaphragm 137 and the exterior of the housing 131, the outer end of the passage 138 being connected to a pipe 139 forming a part of the pneumatic unloading apparatus 100, to be described more fully hereinafter.

In order to effect the desired control of the flow of cement from the sump 70 into the entrainment chamber 120, the discharge valve 130 is provided with a valve closure member 140 having a substantially planar upper surface 141 that cooperates with a valve seat 142 on the lower end of the discharge pipe 118 to form a sealing contact therebetween when it is desired to interrupt the flow of the cement from the sump 70 into the discharge pipe 110. The lower end of the closure member 140 carries an outwardly extending flange 143 which bears against the upper surface of the diaphragm 133, a mounting ring 144 being disposed below the diaphragm 133 and in vertical alignment with the flange 143 for mounting the closure member 140 on the diaphragm 133. More specifically, the diaphragm 133, the flange 143 and the mounting ring 144 have aligned openings therethrough that receive bolts 148 having thereon cooperating nuts 149 firmly to clamp the diaphragm 133 between the flange 143 and the mounting ring 144. The valve closure member 140 further has a recess 146 on the underside thereof which receives therein the upper end of a spring 145, the lower end of the spring 145 being positioned by a stud 147 extending upwardly from the housing 131 and into the spring 145. The spring 145 serves as a counterbalancing agent and is normally under compression and urges the valve closure member 140 into the closed position wherein the upper surface 141 thereof is in contact with the valve seat 142 thus to close the discharge pipe 118 and to interrupt the flow of cement from the sump 70 into the entrainment chamber 120.

In order to facilitate the unloading of the cement from the body shell 40, the fluid-tight chamber defined by the body shell 40 is placed under positive pressure, i.e., superatmospheric pressure, during the unloading operation, this resulting from the introduction of air through the fabric sheets 80 and 90 as will be described more fully hereinafter. The air thus introduced through the fabric sheets 80 and 90 is then fed to the discharge tube 110 and used to entrain the cement in the entrainment chamber 120 and to convey the cement to a distant point of discharge and storage. The air within the body shell 40 is introduced into the entrainment chamber 120 through a jet pipe 150 disposed within the body shell 140, the details of construction of the jet pipe 150 being best illustrated in FIGS. 25 and 26 of the drawings. As illustrated, the jet pipe 150 includes an upper section 151 and a lower section 152 disposed in longitudinal alignment and arranged vertically adjacent to the central section 41 (see FIG. 1) and arranged in the lateral midpoint of the body shell 40. The adjacent ends of the pipe sections 151 and 152 are both mechanically interconnected and pneumatically connected by a dresser coupling 153, and the lower end of the lower section 152 extends downwardly through the cricket 83 and through an opening of the body shell 40 and carries thereon a T-joint 156. Extending outwardly and in lateral directions from the T-joint 150 are two pipes 157 and 158 that are connected through valves, to be described more fully hereinafter, to the end sections 113 and 114, respectively, of the discharge tube 110. The upper end of the upper pipe section 151 extends substantially to the upper portion of the body shell 40 and is fixedly held in place by a plurality of gusset plates 154 and a mounting ring 155. More specifically, the body shell 40 has a generally circular opening directly above the upper pipe section 150 and has suitably secured thereto, as by welding, the annular mounting ring 155, the inner diameter of the mounting ring 155 being substantially greater than the outer diameter of the upper pipe section 151. The gusset plates 154 are suitably secured, as by welding, both to the pipe section 151 and to the mounting ring 155, thus fixedly to position the upper end of the upper pipe section 151.

There is provided in association with the upper end of the pipe section 151 an air regulator 160, the air regulator 160 serving to close the upper end of the jet pipe 150 unless a predetermined pressure is present within the body shell 40, thus to prevent an inadvertent and undesired introduction of cement into the jet pipe 150 during use of the railway car 30. The air regulator 160 includes a flexible diaphragm 161 that overlies the upper end of the jet pipe 150 and the upper surface of the mounting ring 155 and is clamped thereto by an annular plate 162; the diaphragm 161 may be formed of a suitable plastic sheet material such as neoprene. As illustrated, the outer edge of the diaphragm 160 and the plate 162 have aligned openings therethrough that are in alignment with threaded openings in the mounting ring 155 to receive therethrough bolts 166 that clamp the parts in the assembled position illustrated in FIG. 26. The inner periphery of the annular plate 162 has a housing 163 secured thereto, as by welding, and extending upwardly therefrom and being generally annular in cross section and having the upper end closed by a top plate 164. For a purpose to be more fully understood hereinafter, a plurality of downwardly sloping holes 165 is provided in the housing 163 connecting the interior of the housing 163 with the atmosphere. The air regulator 160 further comprises a weight 167 of predetermined value generally cylindrical in shape and arranged concentrically with respect to the upper end of the jet pipe 150 and suitably secured to the flexible diaphragm 161 by a rivet 169, the rivet 169 also serving to secure to the lower surface of the diaphragm 161 a resilient valve member 168 that is adapted to seat upon the upper end of the jet pipe 150. It will be appreciated, therefore, that the weight 167 will normally press the valve member 168 into closing relationship with the upper end of the jet pipe 150 when the pressure within the body shell 40 is substantially equal to the pressure surrounding the body shell 40. When the pressure within the body shell 40 rises, a force will be exerted against the underside of the diaphragm 161 that will be eventually sufficient to lift the weight 167 and the other parts movable therewith, thus to lift the valve member 168 out of sealing engagement with the upper end of the jet pipe 150 and thus to permit entry of the superatmospheric pressure within the body shell 40 into the jet pipe 150 to cause a stream of the superatmospheric air to flow downwardly therethrough and into the pipes 157 and 158. In passing, it will be noted that the holes 165 are necessary to accommodate the upper movement of the diaphragm 161 since such movement will tend to compress the air within the housing 163, which compressed air then escapes through the holes 165.

Referring now specifically to FIG. 17, it will be seen that the pipe 158 is connected to the inlet port of a jet valve 170 and the pipe 157 is connected to the inlet port of a jet valve 171. The jet valves 170 and 171 are respectively provided with handles 172 and 173, which, in turn, carry operating links 174 and 175 provided at the outer ends thereof respectively with operating handles 178 and 179. The outlet ports of the jet valves 170 and 171 are connected respectively by pipe sections 176 and 177 to the end sections 112 and 113, respectively, of the discharge tube 110. It will be appreciated that by the proper operation of the jet valves 170 and 171, coupled with the removal of the appropriate end cap 116 or 117, a stream of superatmospheric air can be established in the discharge tube 110; for example, removal of the end cap 116 and the opening of the valve 171 causing a stream of air to flow from right to left as viewed in FIGS. 16 and 17, and conversely, removal of the end cap 117 and the opening of the valve 170 causes a stream of superatmospheric air to flow through the discharge tube from left to right as viewed in FIGS. 16 and 17. In order further to control the flow of air through the discharge tube 110, a pair of butterfly valves 180 and 181 is provided, the valves 180 and 181 being respectively disposed at the junctures of the sections 112–114 on the one end and sections 113–115 on the other end. The butterfly valves 180 and 181 include the usual valve elements 182 and 183, respectively, and a pair of operating handles 184 and 185, respectively, that are useful in positioning the valve elements 182 and 183, respectively, in the desired orientation.

An important feature of the present invention resides in the provision of mechanism for alternately directing superatmospheric air to the plenum chamber below the fabric sheets 80 and to the plenum chamber below the fabric sheets 90, thus to unload for a short time interval from one end of the railway car 40 and then to unload for a short time interval from the other end of the railway car 30 and then back to the one end, the process being indefinitely repeated until all of the cement has been unloaded from the railway car 30. To this end, a diverting valve mechanism 200 has been provided which is best illustrated in FIGS. 1, 13 to 15 inclusive, 27 and 28. The diverting valve mechanism 200 is operated from the superatmospheric pressure provided in the manifold 105 and referring to FIGS. 13 and 14, it will be seen that an inlet conduit 201 makes connection with the manifold 105 for supplying superatmospheric pressure to the diverting valve mechanism 200; an output of the diverting valve mechanism 200 is a stream of superatmospheric air that is directed into one and only one of a pair of outlet conduits 202 and 203 that are respectively connected to manifolds 204 and 205. The manifold 204 is in communication with the plenum chambers associated with the fabric sheets 80, while the manifold 205 is in communication with the plenum chambers associated with the fabric sheets 90. Accordingly, it will be seen that the diverting valve mechanism 200 serves to direct the stream of superatmospheric air derived from the manifold 105 by the inlet conduit 201 alternately to the plenum chambers associated with the fabric sheets 80 disposed in one end of the body shell 40 and to the plenum chambers associated with the fabric sheets 90 disposed in the other end of the body shell 40, thus alternately to unload cement from the opposite ends of the body shell 40 and thereby uniformly to unload the body shell 40 throughout the length thereof during the unloading process.

The diverting valve mechanism 200 includes a diverting valve 210 and a control valve 220, the details of construction of the valves 210 and 220 being best illustrated in FIG. 28. It will be noted that the superatmospheric air derived from the manifold 105 is conveyed by the inlet conduit 201 to a passage 206 in the diverting valve 210 and also to a conduit 207 which supplies superatmospheric air to an inlet chamber 221 in the control valve 220. The superatmospheric air in the chamber 206 is directed through a conduit 211 to an interaction chamber 212 having the general construction illustrated, and at the juncture of the conduit 211 and the interaction chamber 212 a pair of control ports 213 and 214 are disposed on opposite sides thereof to act in turn upon the stream of air flowing from the conduit 211 into the interaction chamber 212. The interaction chamber 212 is further provided with a pair of outwardly diverging walls 215 and 216 along which the stream of air alternately flows, and adjacent to the outer end of the walls 215 and 216 are disposed, respectively, the pick-up openings 217 and 218. The interaction chamber 212 has an outlet port opposite the inlet conduit 211 and the outlet port communicates with a pair of outwardly diverging conduits which are the outlet conduits 202 and 203 previously described above.

Referring now to the construction of the control valve 220, the inlet chamber 221 is connected to an interaction chamber 222, the juncture therebetween having disposed on the opposite sides thereof control parts 223 and 224 that are useful in directing the flow of air from the inlet chamber 221 into the interaction chamber 222. The interaction chamber 222 has a pair of outwardly diverging side walls 225 and 226 that extend to an outlet port that is in connection with a pair of outwardly diverging control ports 227 and 228. The outer end of the control port 227 is connected by a conduit 229 to the control port 213 of the diverting valve 210, and the outer end of the control port 228 is connected by a conduit 230 to the control port 214 of the diverting valve 210. In addition, a line 231 interconnects the pick-up opening 217 to an adjustable control valve 233, and a like line 232 connects the pick-up opening 218 to another adjustable control valve 234. The outlet port of the control valve 233 is connected by a conduit 235 both to the control port 223 and to a tank 237, and likewise, a conduit 236 interconnects the outlet port of the control valve 234 both to the control port 224 and to a tank 238.

The diverting valve 210 and the control valve 220 cooperate to form a switching mechanism that serves to switch or divert the stream of air entering the inlet conduit 201 alternately to the outlet conduits 202 and 203. In the operation of the valves 210 and 220 to achieve this end, air under pressure in the inlet conduit 201 is fed into the chamber 206 and flows therefrom via the conduit 207 into the inlet chamber 221 of the control valve 220. Another stream of air from the chamber 206 flows through the conduit 211 into the interaction chamber 212 of the diverting valve 210. For purposes of illustration, it will be asumed that a supply of control air is flowing into the control port 214 which causes the main air stream in the interaction chamber 212 to follow the upper wall 215 thereof and thus to build up pressure in the pick-up opening 217; and further, the main air stream is deflected from the wall 215 into the outlet conduit 203 and thus is directed to the plenum chambers associated with the fabric sheets 90. At this time, the control air flowing from the inlet chamber 221 and into the interaction chamber follows the wall 225 and is deflected therefrom into the control port 228 from which it flows via the conduit 230 into the control port 214, as previously noted.

The control air supplied into the pick-up opening 217 flows via the line 231 and through the adjustable control valve 233 into the conduit 235 and therefrom fundamentally into the tank 237. After a first given time interval, depending primarily upon the resistance to air flow of the control valve 233 and upon the volume or air stiffness of the tank 237, the air pressure in the tank 237 builds up to a control pressure so that the control air flows from the tank 237 via the conduit 235 into the communicating control port 223. The control air entering the control port 223 acts upon the air entering the interaction chamber 222 to switch the flow thereof from the wall 225 onto the wall 226; whereby the control air is deflected from the wall 226 to the control port 227. The control air flows from the control port 227 via the conduit 229 into the control port 213, so as to switch, in the interaction chamber 212, the main air supplied from the chamber 206 from the wall 215 onto the wall 216; whereby the main air stream following the wall 216 is deflected therefrom into the outlet conduit 202 and thus to the plenum chambers associated with the fabric sheets 80; and further the main air stream following the wall 216 builds up pressure in the pick-up opening 218.

The control air supplied into the pick-up opening 218 flows via the line 232 and through the adjustable control valve 234 into the conduit 236 and therefrom fundamentally into the tank 238. After a second given time interval, depending primarily upon the resistance to air flow of the control valve 234 and upon the volume or air stiffness of the tank 238, the air pressure in the tank 238 builds up to a control pressure, so that the control air flows from the tank 238 via the conduit 236 into the communicating control port 224. The control air from the control port 224 switches, in the interaction chamber 222, the control air supplied from the inlet chamber 221 from the wall 226 onto the wall 225; whereby the control air is deflected from the wall 225 into the control port 228. Control air flows from the control port 228 via the conduit 230 into the control port 214 so as to switch, in the interaction chamber 212, the main air supplied from the chamber 206 from the wall 216 onto the wall 215; whereby the main air stream following the wall 215 is deflected therefrom into the outlet conduit 203 and thus is supplied to the plenum chambers associated with the fabric sheets 90; and further the main air stream following the wall 215 builds up pressure in the pick-up opening 217. The operating conditions are now back to the original condition first described above and thereafter the operation is repeated, all as described herein.

From the above, it will be appreciated that the described oscillation of the central valve 220 continues with the resulting switching of the main air stream from the diverting valve 210 into the outlet conduits 202 and 203. Thus the control valve 220, together with the two tanks 237 and 238 and the two control valves 233 and 234 constitute an oscillator for effecting cyclic control of the diverting valve 210, thus to effect cyclic diverting of the main air stream between the outlet conduits 202 and 203. Such diverting of the main air stream through the conduits 202 and 203 thus causes cyclic unloading of the opposite ends of the railway car 30 alternately through the fabric sheets 80 and 90, respectively. Preferably, the diverting valve 210 operates alternately between its two positions, i.e., between the positions diverting the air stream to the conduits 202 and 203, respectively, at a frequency dependent upon the design of the vehicle being unloaded, the density of the lading, etc., but generally in the range from about 2 to 20 cycles per minute, the preferred frequency being 5 to 6 cycles per minute. There results an even unloading of the cement from the opposite ends of the railway car 30 and thus insures more complete unloading of the cement from the railway car 30, as will appear more fully hereinafter.

The high pressure air supplied by the outlet conduits 202 and 203 is carried through the associated manifolds 204 and 205 to the plenum chambers associated with the fabric sheets 80 and 90, respectively, which high pressure air proceeds through the fabric sheet 80, for example, and into the previously mentioned two troughs associated therewith and thus into the lading compartment defined in the body shell 40. The passage of air through the fabric sheets 80 effects aeration or fluidization of the adjacent portion of the cement in the two troughs mentioned and the consequent fluid flow of the cement downwardly in the two troughs mentioned into the sump 70; and from the sump 70 the cement is conveyed to the exterior of the body shell 40 through the discharge tube 110, as will be explained more fully below. Since the air chambers associated with the fabric sheets 80 are in open communication with each other and constitute a common plenum chamber, there is always ample air under relative high pressure in the common plenum chamber for the purpose of fluidizing the cement contained in the adjacent end of the lading compartment. Moreover, since there is only a relatively small pressure drop or gradient between the common plenum chamber associated with the fabric sheets 80 and the lading compartment defined in the body shell 40, the elements 81, 83 and 85 are subjected only to this small pressure differential; with the result that the relatively high pressures in the common plenum chamber for the fabric sheets 80 and in the lading compartment produces no substantial strain or deformation of the elements 81, 83 and 85 incident to unloading of the cement from the lading compartment, as explained more fully below.

The remarks set forth in the preceding paragraph with respect to the plenum chamber and components associated with the fabric sheets 80, are also true when applied to the fabric sheets 90 and the associated footings and elements 93 and 95. Also, the relatively high air pressures effect no substantial strain or deformation of the body shell 40 due to the general cylindrical configuration thereof and due to the presence of the stay rods 62.

The diverting valve 210 not only serves to divert or switch the main air stream between the outlet conduits 202 and 203, but this switching is effected rapidly, there being rapid operation of the diverting valve 210 under the action of the control valve 220. As a result, the supply of air under superatmospheric pressure into the plenum chambers associated with the fabric sheets 80 and 90 respectively, is initiated abruptly with the result that a high velocity shock wave is produced that travels through the plenum chamber with the consequent vibration of the flexible fabric sheets 80 and 90 and the resulting shaking of the adjacent portion of the cement in the bottom of the troughs associated with the fabric sheets 80 and 90. This action serves to clear or unblock the fabric sheets 80 and 90 throughout the areas thereof further to break-up any clumps or non-pulverulent areas in the cement. As a consequence, there is a more even and more constant feeding of the cement downwardly along the troughs and into the sump 70, with the consequent more rapid and more even discharge of the cement from the railway car 30. Not only is the supply of air under superatmospheric pressure into the plenum chamber abruptly initiated, but such supply of air is also abruptly arrested causing a corresponding rapid change of the pressure in the air in the plenum chamber with the consequent vibration of the flexible fabric sheets 80 and 90 and the resulting shaking of the adjacent portion of the cement in the bottom of the associated troughs. Thus the clearing and unclogging action described above is obtained twice during the supplying of air to each of the fabric sheets 80 and 90, as the case may be, i.e., both at the initiation of the passage of air therethrough and at the arresting of the passage of air therethrough.

In order to protect the receiving bin into which the cement is being delivered from the discharge tube 110 when the last of the cement is delivered from the body shell 40, and also in the event that there is a loss of supply of air pressure to the manifold 105, the blow-down rate control valve 240 has been provided, the construction and operation thereof being best illustrated in FIGS. 1, 14, 22, 23, 24 and 27. The control valve 240 includes a generally dish-shaped housing 241 having an outwardly directed flange 242 around the upper edge thereof and adapted to receive thereon a domed cover 246. A diaphragm 245 covers the upper end of the housing 241 and extends outwardly over the flange 242, the diaphragm 245 being made of a synthetic organic plastic such as neoprene. The flange 242, the outer portion of the diaphragm 245 and the outer portion of the cover 246 have aligned openings therein receiving bolts 243 therethrough having cooperating nuts 244 thereon, thereby to assemble and hold the parts in the position illustrated in FIGS. 22 and 23. The diaphragm 245 serves to provide a lower chamber 247 disposed therebelow and an upper chamber 248 disposed thereabove. Mounted centrally on the cover 246 is a needle valve 250 including a housing 251 integral with the cover 246 and extending upwardly therefrom. The housing 251 is essentially hollow and receives therein a valve element 252 generally cylindrical in shape and having a conical upper end that cooperates with a complementarily shaped valve seat 253 formed in the lower end of a plug 254 threadedly mounted in the housing 251. The plug 254 has a passage 255 therein communicating at one end with the valve seat 253 and at the other end with an opening extending laterally through the housing 251 and communicating with a pipe 265 mounted thereon. The lower end of the valve element 252 cooperates with a valve actuator 256 slidably mounted in the housing 251 for vertical movement with respect thereto and for carrying the valve element 252 upwardly and downwardly therewith. In order to move the valve actuator 256, a pair of circular plates 257 are disposed on opposite sides of the diaphragm 245 centrally thereof and are riveted one to the other as illustrated and carry centrally a stud 258 that bears against the lower end of the valve actuator 256. A spring 259 is provided in the housing 251 and acts between the plug 254 and a pin carried by the valve element 252, the spring 259 being normally under compression and urging the valve element 252 downwardly to open the lower end of the passage 255. A lateral opening is provided in the housing 251 to the left as viewed in FIG. 23 and communicating with the pipe 139, whereby when the valve element 252 is out of engagement with the valve seat 253, a connection is made from the pipe 139 through the housing 251 past the valve seat 253 and through the passage 255 to the pipe 265. There further is provided an orifice 260 in the valve actuator 256 so as to provide constant communication between the pipe 139 and the upper chamber 248. Referring to FIGS. 1 and 14, it will be seen that the blow-down rate control valve 240 is mounted toward the bottom of the body shell 40 and on the lefthand edge of the central section 41 as viewed in FIGS. 1 and 2, and more specifically is mounted on a pair of mounting brackets 261 (see FIG. 22) that have openings therein receiving therethrough the lower ends of the bolts 243, additional nuts 262 being provided to clamp the mounting brackets 261 against the nuts 244.

In order to obtain the desired operation of the valve 240, it is necessary to provide predetermined communication between the chambers 247 and 248, and to this end a check valve 270 and a needle valve 280 have been provided. Referring first to FIG. 23, the check valve 270 includes a passage 271 in the cover 246 and a passage 272 in the housing 241 that meet through an opening in the diaphragm 245. A ball 273 is provided selectively to close the juncture of the passages and is urged into the closed position by a spring 274. In order to seal around the juncture between the passages, an O-ring 275 is provided thereabout as indicated.

The needle valve 280 is disposed adjacent to the check valve 270 and includes a passage 281 in the cover 246, a passage 282 in the housing 241 and a threaded opening 285 interconnecting the passages. A conical valve element 243 is provided at the upper end of the opening 285 to close the passage 282 thereat, the valve element 283 being mounted on a threaded base 284, the base 284 having a tool receiving opening 286 in the lower end thereof whereby the orifice about the valve element 283 can be adjusted by threadedly moving the numbers 283 and 284 in the threaded opening 285. A plug 287 closes the lower end of the threaded opening 285 and a pair of O-rings 288 seal the juncture around the passages in the housing 241 and cover 246.

Additional controls for the pneumatic unloading apparatus 100 are provided at a pair of instrument plates 300 and 301 disposed on opposite sides of the railway car 30 for ready access to a workman during the loading and unloading operations. Referring particularly to FIGS. 14 to 19 and 27, it will be seen that the instrument plates 300 and 301 are respectively disposed at essentially the midpoint of the discharge tube and sections 112 and 113, and are disposed in planes substantially normal to the longitudinal axis of the discharge tube 110. As illustrated, the handles 178 and 179 for operating the valves 170 and 171 are accessible at the instrument plates 301 and 300, respectively. The pipe 265 that connects to the outlet of the needle valve 250 has two branches as seen in FIG. 17, one of the branches extending to the left therein and connecting to a check valve 264 which is in turn connected by a pipe 266 to one connection of a cut-off valve 290, the other connection of the cut-off valve 290 being connected by a pipe 294 to the interior of the end section 112, the cut-off valve 290 having an operating handle 292 accessible to the instrument plate 300; the check valve 264 permits flow of air only from the pipe 265 to the pipe 266. At the juncture between the cut-off valve 290 and the pipe 294 is a pressure gauge 302 which indicates the pressure in the associated areas. Also connected to the pipe 294 is a vent valve 296 having an operating handle 298 and discharging through a vent outlet 276 to the atmosphere for venting of the associated portions of the system, the handle 298 of the vent valve 296 also being available at the instrument plate 300. Finally, a pressure gauge 304 is provided that is connected by a line 306 to the plenum chamber associated with the fabric sheets 80 for monitoring the pressure therein. All of the parts described above present at the instrument plate 300 are protected during travel of the railway car 30 by a cover 310 secured to the instrument plate 300 by a hinge 312.

The righthand branch of the pipe 265 extends to a check valve 263 which is in turn connected by a pipe 267 to one connection of a cut-off valve 291, the other connection of the cut-off valve 291 being connected by a pipe 295 to the interior of the end section 113, the cut-off valve 291 having an operating handle 293 accessible at the instrument plate 301; the check valve 263 permits flow of air only from the pipe 265 to the pipe 267. At the juncture between the cut-off valve 291 and the pipe 295 is a pressure gauge 303 which indicates the pressure in the associated areas. Also connected to the pipe 295 is a vent valve 297 having an operating handle 299 and discharging through a vent outlet 277 to the atmosphere for venting of the associated portions of the system, the handle 299 of the vent valve 297 also being available at the instrument plate 301. Finally, a pressure gauge 305 is provided that is connected by a line 307 to the plenum chamber associated with the fabric sheets 90 for monitoring the pressure therein. All of the parts described above present at the instrument plate 301 are protected during travel of the railway car 30 by a cover 311 secured to the instrument plate 301 by a hinge 313.

Considering now the general mode of loading the body shell 40 with the cement, it is first noted that the clamps 125 should be placed in position to assemble the discharge valve 130 onto the discharge tube 110, and the spring 145 will serve to move the valve closure member 140 into the closed position thereof with respect to the discharge pipe 118. The butterfly valves 180 and 181 will be manually closed, the end caps 116 and 117 will be positioned on the ends of the discharge tube 110, the jet valves 170 and 171 closed and the cut-off valves 290 and 291 closed. And at this time, it may be assumed that the body shell 40 is empty. The covers 61 are then removed from all of the manway structures 60 and the interior of the railway car 30 is inspected to be sure that it is in suitable condition for the product to be loaded. The body shell 40 may be loaded through any one of the three manway structures 60 until the lading compartment is completely filled. Any material on the edge or rim of the manway structure is first carefully removed and thereafter the covers 61 returned to the closed position and sealed.

When the cement is thus loaded in the body shell 40, the lading compartment is filled with the cement and the weight of the cement rests fundamentally upon the slope sheets 85 and 95, the crickets 83 and 93 and the fabric sheets 80 and 90 respectively carried by their associated footings. The weight of the cement is also carried by the valve closure member 140, the discharge valve 130 being clamped in the closed position by the clamps 125 and the end caps 116 and 117 being secured in place, whereby the interior of the body shell 40 is subjected to atmospheric pressure and the lading compartment defined in the body shell 40 is completely closed against the admission of moisture thereinto and consequently into the cement that is contained in the lading compartment.

Considering now the unloading of the cement from the lading compartment defined in the body shell 40, it is first noted that such unloading may take place from either side of the body shell 40, since the necessary mechanisms may be selectively operated from either side of the body shell 40 employing the instrumentalities available at the instrument plates 300 and 301, and the butterfly valves 180 and 181 may be respectively selectively operated employing the hand levers 184 and 185. In either case, the high pressure air supply system is connected to the adjacent one of the high pressure supply nozzles 101 after the removal of the cap 102 therefrom, and the closure cap 116 and 117, as the case may be, is removed and that end of the discharge tube 110 is connected via the pneumatic unloading equipment to the receiving bin; and it may be assumed that the cement is to be unloaded from the lefthand side of the body shell 40 as viewed in FIG. 27. In such case the end cap 116 is removed from the end section 112 and a suitable unloading hose is connected thereto for conveying of the cement to the receiving bin. The cover 310 on the instrument plate 300 is lifted and the jet valve 171 is closed by pushing the control link 175 in toward the car by using the handle 179. The vent valve 296 is closed by pushing the handle 298 toward the car 30, and the cut-off valve 290 is closed by moving the handle 292 downwardly to the vertical position. The duplicate set of controls at the instrument plate 301 must also be in the closed position. The high pressure air system is then connected to the adjacent supply nozzle 101 which causes air to pass into the manifold 105 and into the interior of the body shell 40 fully to pressurize the railway car 30 to the desired operating pressure, this pressure being readable on the pressure gauge 302.

Applying the operating pressure to the manifold 105 and to the interior of the body shell 40 will also supply high pressure air via the manifold 105 to the upper chamber 248 of the blow-down rate control valve 240, a portion of the air in the chamber 248 flowing through the check valve 270 into the lower chamber 247. Another portion of the air in the upper chamber 248 blows through the orifice 260 and via the pipe 139 into the chamber of the discharge valve 130 so as to keep the diaphragm 133 in its closed position preventing the discharge of the cement from the storage chamber in the body shell 40 into the entrainment chamber 120 of the discharge tube 110.

To start conveying of the cement from the body shell 40, the jet valve 171 is opened by pulling the handle 179 to the left as viewed in FIG. 17 from the operator's position at the instrument plate 300. The cut-off valve 290 is next opened after which the air from the chamber in the discharge valve 130 bleeds through the conduit 139 via the now opened needle valve 250 (the high pressure in the chamber 248 moving the diaphragm 245 downwardly to permit the spring 259 to open the needle valve 250) and thence via the pipe 265, the check valve 264 and the open cut-off valve 290 into the end section 112 adjacent to the open end of the discharge tube 110. Equalization of the pressure across the diaphragm 133 of the discharge valve 130 takes place so that the weight of the cement in the body shell 40 and the air pressure within the body shell 40 causes the diaphragm 133 to move into its open position indicated by the dashed lines, so that the cement in the body shell 40 falls into the entrainment chamber 120 and is picked up by the air passing from the right toward the left through the discharge tube 110 and is thus blown through the open lefthand end of the discharge tube 110; whereby the cement is thus pneumatically conveyed from the body shell 40 through the discharge tube 110 and out of the lefthand end thereof.

Application of the high pressure air supply to one of the supply nozzles 101, and thus to the manifold 105, also supplies the high pressure air supply to the input conduit 201 of the diverting valve mechanism 200. Assuming that the diverting valve mechanism is in condition such as to divert the air supply into the outlet conduit 202, and further assuming that the parts are arranged to provide an operating frequency of 5 cycles per minute, high pressure air is supplied via the manifold 205 to the plenum chamber associated with the fabric sheets 80, and the high pressure air effects aeration or fluidization of the adjacent layers of the cement in the lading compartment; whereby such adjacent layers of fluidized cement slide down the fabric sheets 80 from the adjacent end of the lading compartment and empty into the sump 70 disposed at the lower end thereof; whereby for a brief period of about 6 seconds the lading compartment is emptied into the sump 70 from the end thereof beneath which are disposed the fabric sheets 80 and the cement is unloaded therefrom to the receiving bin via the pneumatic unloading equipment.

After the aforesaid brief period of operation via the fabric sheets 80, depending on the desired frequency of operation referred to hereinabove, the control valve 220 operates to switch the diverting valve 210 so that the stream of high pressure air is now directed into the outlet conduit 203 and via the manifold 205 to the plenum chambers associated with the fabric sheets 90 in the other end of the railway car 30; again the high pressure air effects aeration or fluidization of the adjacent layers of the cement in the lading compartment, whereby such adjacent layers of fluidized cement slide down the fabric sheets 90 from the adjacent end of the lading compartment and empty into the sump 70 disposed at the lower ends thereof; whereby the adjacent end of the lading compartment is emptied into the sump 70 and unloaded therefrom to the receiving bin via the pneumatic unloading equipment, all for a brief period of approximately six seconds. Thereafter the control valve 220 again switches the diverting valve 210 so as to direct the stream of high pressure air to the conduit 202 and thus via the manifold 204 to the plenum chambers associated with the fabric sheets 80, thereby to again begin unloading from the end of the railway car 30 in which are disposed the fabric sheets 80. Unloading via the fabric sheets 80 is continued for separated brief intervals of 6 seconds, between which intervals unloading is accomplished via the fabric sheets 90, whereby the ends of the railway car 30 are alternately unloaded for brief periods of time equal to about 6 seconds until all of the lading is emptied therefrom through the sump 70 and conveyed into the associated receiving bin.

Not only does the diverting valve mechanism 200 unload the railway car 30 alternately via the fabric sheets 80 and then via the fabric sheets 90, but the switching effected under the control of the valve 220 is rapid both to initiate unloading abruptly and to arrest the unloading abruptly via the fabric sheets 80 and 90. The abrupt initiation and abrupt arresting of the flow of air through the fabric sheets 80 and 90 causes corresponding rapid changes of the pressure of the air in and causes a high velocity shock wave to travel through the plenum chambers with a consequent vibration of the associated fabric sheets 80 or 90, as the case may be, and the resultant shaking of the adjacent portion of the cement in the bottom of the trough associated therewith. As a result, each of the fabric sheets 80 is vigorously shaken once every 6 seconds to clean and clear the same and the cement lying thereover is also vigorously pounded to break up any undesirable formations thereof. Accordingly, the railway car 30 is rapidly and smoothly unloaded.

To stop conveying of the cement from the body shell 40 prior to the complete emptying of the body shell 40, the cut-off valve 290 is closed thereby to prevent discharge of air through the pipe 265, so that the air pressure in the chamber of the discharge valve 130 builds up to effect the operation of the diaphragm 133 into its closed position so as to cut off the supply of cement from the body shell 40 into the entrainment chamber 120 of the discharge tube 110. If it is desired thereafter to restart the conveying of the cement from the body shell 40, it is only necessary again to reopen the cut-off valve 290; whereby the remainder of the operation is the same as that described above in conjunction with the starting of the conveying of the cement from the body shell 40.

Considering now more fully the supply of air into the discharge tube 110 for conveying purposes, the air within the body shell 40 acts upon the diaphragm 161 in the air regulator 160 (see FIGS. 25 and 26) so as to lift the diaphragm 161 and the weight 167 carried thereby upwardly with the result that the closure member 168 is removed from the top of the jet pipe 150. High pressure air now flows downwardly through the jet pipe 150 and into the pipe 157 and through the open jet valve 171 into the end section 113 disposed to the right. This high pressure air then flows from right to left through the discharge tube 110 and entrains the cement disposed in the entrainment chamber 120 so as to convey the cement through the lefthand end of the discharge tube 110 and to the associated storage bin.

While there is cement in the lading compartment to be unloaded, there is substantial air pressure in the sump 70 as well as in the chamber of the discharge valve 130 disposed below the diaphragm 133, whereby the small differential pressures exerted upon the opposite sides of the diaphragm 133 act with the weight of the cement to hold the valve member 140 downwardly into its open position with respect to the open end of the discharge pipe 118. Moreover, the friction drag of the cement in the pneumatic unloading equipment prevents undue high pressure in the receiving bin, whereby there is no damage to the receiving bin at this time.

When substantially all of the cement has been unloaded from the lading compartment defined in the body shell 40, the resistance to air flow from the pneumatic unloading equipment through the conveying lines is reduced, by reason of the material being unloaded therefrom, thereby permitting more free or increased flow of air from the chamber 40 to the receiving bin, which increase in air flow causes a rapid rise in pressure in the receiving bin, unless the discharge valve 130 is quickly operated at this time back into its closed position to throttle the flow of high pressure air from the lading compartment confined in the body shell 40 into the pneumatic unloading equipment and thus into the receiving bin. This is known as the "bubble" effect, and unless the same is prevented, the rapid rise of the air pressure in the receiving bin represents an "explosion" therein; whereby the receiving bin is damaged, or on occasion, completely destroyed or split open.

Mechanism has been provided to prevent the undesired results of the above described "bubble" effect, which mechanism also operates when there is an undue reduction of the pressure in the body shell 40, which reduction of pressure may result either from emptying of the cement from the body shell 40 or from failure of the machinery supplying the superatmospheric pressure into the body shell 40.

Upon an undue reduction of pressure in the body shell 40, the pressure of air in the chamber 248 of the blowdown control valve 240 is greatly reduced; whereby the pressure of the air in the lower chamber 247 of the blowdown control valve 240 exceeds the pressure of the air in the chamber 248. Thus the air in the chamber 247 slowly bleeds through the needle valve 280 into the chamber 248 in order to equalize the air pressures in the two chambers 247 and 248. The above described equalization of the air pressure between the two chambers 247 and 248 in the blow-down control valve 240 takes place only after the passage of a substantial time interval; whereby at the beginning of the process, there is a differential pressure across the diaphragm 245 causing the same to lift the needle valve 250, specifically the valve element 252 into its closed position which serves to cut off the connection between the pipes 139 and 265. This action prevents bleed-back from the chamber in the discharge valve 130 through the pipes 139 and 265 and the valves 264 and 290 into the discharge tube 110 adjacent to the end thereof from which has been removed the closure cap 116, so that the pressure in the chamber of the discharge valve 130 builds up in order to effect quick movement of the diaphragm 133 of the discharge valve 130 into its closed position, thereby to cut off the further supply of air from the body shell 40 into the discharge tube 110.

If the differential pressure between the chambers 247 and 248 is due to the circumstance that the body shell 40 is empty of cement and if air is still supplied into the body shell 40 at high pressure, the rate of pressure drop in the body shell 40 is stopped or arrested so that when the pressures in the chambers 247 and 248 are again equalized, the needle valve 250, and specifically the valve element 252, will again be operated into its open position, thereby to bring about the reconnection of the pipes 139 and 265, with the result that the pressure in the chamber of the discharge valve 130 is reduced; whereby the diaphragm 133 of the discharge valve 130 is again operated into its open position so that the air in the body shell 40 again flows through the discharge tube 110 and out of the open end thereof from which has been removed the end cap 116.

Thereafter, at his convenience, the operator may close the high pressure air supply and disconnect the same from the high pressure supply nozzle 101, and then replaces the cap 102 thereon. Subsequently, the operator disconnects the pneumatic unloading equipment from the lefthand end of the discharge tube 110. When the pressure in the lading compartment defined by the body shell 40 subsides and is again reduced to atmospheric pressure, the operator then actuates the levers 184 and 185 to operate the butterfly valves 180 and 181 back into the closed positions thereof and actuates the handle 179 to close the jet valve 171, and actuates the handle 292 with the cut-off valve 290 to return it to its closed position. Finally, the operator replaces the cap 116 on the lefthand opening of the discharge tube 110.

Assuming that the cement is to be unloaded from the righthand side of the body shell 40, as shown in FIG. 27, the operation proceeds in the manner substantially identical to those described above, except that in this case the cap 117 on the righthand end of the discharge tube 110 is removed; and the pneumatic unloading equipment is connected to the righthand opening of the discharge tube 110. The jet valve 170 is operated into its open position employing the handle 178, and the butterfly valves 180 and 181 are operated into the open positions thereof employing the handles 184 and 185. In this case, the high pressure air from the jet pipe 150 proceeds through the conduit 158 and the jet valve 170 into the lefthand end of the discharge tube 110; whereby the air passes through the discharge tube 110 toward the right and into the pneumatic unloading equipment connected to the righthand end of the discharge tube 110. The passage of the air stream to the right through the discharge tube 110 effects pickup of the cement at the entrainment chamber 120, and the entrainment of the cement therein in the manner previously described. The unloading of the lading compartment and the subsequent automatic closure of the discharge valve 130, upon completion of the unloading operation, are the same as described. Finally, the operator readies the railway car 30 for reuse, all in the manner previously described, employing the appropriate handles for this case.

In view of the foregoing, it is apparent that there has been provided a railway car for transporting pulverulent material ladings that is of improved and simplified construction and arrangement; whereby the lading may be readily loaded and unloaded with respect to the body shell employing corresponding loading and unloading systems of the pneumatic type; wherein the unloading proceeds uniformly from end-to-end of the car due to the alternate unloading through the fabric sheets 80 and 90 under the control of the diverting valve 210 and the control valve 220, thus providing for rapid and smooth unloading of the lading; and wherein the body shell 40 may be unloaded from either side thereof by the unloading system. Further, the body shell incorporates an improved structural arrangement for aerating or fluidizing the pulverulent lading, so as to positively insure easy and complete unloading of the body shell by the automatic unloading system employing high pressure air in the general range 15 p.s.i.g. to 45 p.s.i.g. Moreover, the pneumatic unloading system incorporates an improved automatic valve mechanism that automatically closes upon completion of the unloading operation, thereby positively to prevent damage to the receiving bin, at this time. This arrangement is highly advantageous, since it renders practical such a high pressure unloading system, without danger to the receiving bin, so that the pulverulent material may be unloaded directly from the railway car to the receiving bin without intermediate apparatus, except a connecting conduit or pipe, even though the receiving bin is located ten to twenty stories above the railway track.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In combination, a container for defining a fluid-tight storage chamber adapted to receive a pulverulent material, means accommodating the loading of the pulverulent material into said storage chamber, means defining a sump in the bottom of said container and communicating with said storage chamber, structure defining an elongated trough in the bottom of said container, said trough having an open top communicating with the bottom of said storage chamber, said trough occupying an inclined position in the bottom of said container and extending from a lower position disposed adjacent to said sump to an upper position disposed remote from said sump, the lower end of said trough communicating with said sump, an elongated porous element closing the bottom of said trough and contacting the adjacent portion of the pulverulent material therein, said structure also defining an elongated plenum chamber disposed below said trough and communicating with said element, a pipe adapted to contain air under superatmospheric pressure, valve mechanism connecting said plenum chamber to said pipe and having open and closed positions, control means for cyclically operating said valve mechanism alternately between its two positions, whereby the supply of air under superatmospheric pressure into said plenum chamber from said pipe is initiated by operation of said valve mechanism into its open position and is arrested by operation of said valve mechanism into its closed position, and whereby the air under superatmospheric pressure supplied into said plenum chamber penetrates said porous element and passes into said storage chamber and also fluidizes the adjacent portion of the pulverulent material in the bottom of said trough causing the fluidized pulverulent material to feed downwardly along said element into said sump, said control means being characterized by rapid operation of said valve mechanism from its closed position into its open position, whereby the supply of air under superatmospheric pressure from said pipe into said plenum chamber is initiated abruptly causing a high velocity shock wave to travel through said plenum chamber with the consequent vibration of said element and the resulting shaking of the adjacent portion of the pulverulent material in the bottom of said trough, and means for unloading to the exterior of said container the pulverulent material fed into said sump.

2. In combination, a container defining a fluid-tight storage chamber adapted to receive a pulverulent material, means accommodating the loading of the pulverulent material into said storage chamber, means defining a sump in the bottom of said container and communicating with said storage chamber, structure defining an elongated trough in the bottom of said container, said trough having an open top communicating with the bottom of said storage chamber, said trough occupying an inclined position in the bottom of said container and extending from a lower position disposed adjacent to said sump to an upper position disposed remote from said sump, the lower end of said trough communicating with said sump, an elongated porous element closing the bottom of said trough and contacting the adjacent portion of the pulverulent material therein, said structure also defining an elongated plenum chamber disposed below said trough and communicating with said element, a pipe adapted to contain air under superatmospheric pressure, valve mechanism connecting said plenum chamber to said pipe and having open and closed positions, control means for cyclically operating said valve mechanism alternately between its two positions, whereby the supply of air under superatmospheric pressure into said plenum chamber from said pipe is initiated by operation of said valve mechanism into its open position and is arrested by operation of said valve mechanism into its closed position, and whereby the air under superatmospheric pressure supplied into said plenum chamber penetrates said porous element and passes into said storage chamber and also fluidizes the adjacent portion of the pulverulent material in the bottom of said trough causing the fluidized pulverulent material to feed downwardly along said element into said sump, said valve mechanism being characterized by rapid operation from each one of its positions into the other of its positions, whereby the supply of air under superatmospheric pressure from said pipe into said plenum chamber is both abruptly initiated and abruptly arrested causing corresponding rapid changes of the pressure of the air in said plenum chamber with the consequent vibration of said element and the resulting shaking of the adjacent portion of the pulverulent material in the bottom of said trough, and means for unloading to the exterior of said container the pulverulent material fed into said sump.

3. In combination, a container defining a fluid-tight storage chamber adapted to receive a pulverulent material, means accommodating the loading of the pulverulent material into said storage chamber, means defining a sump in the bottom of said container and communicating with said storage chamber, structure defining an elongated trough in the bottom of said container, said trough having an open top communicating with the bottom of said storage chamber, said trough occupying an inclined position in the bottom of said container and extending from a lower position disposed adjacent to said sump to an upper position disposed remote from said sump, the lower end of said trough communicating with said sump, an elongated porous element closing the bottom of said trough and contacting the adjacent portion of the pulverulent material therein, said structure also defining an elongated plenum chamber disposed below said trough and communicating with said element, a pipe adapted to contain air under superatmospheric pressure, valve mechanism connecting said plenum chamber to said pipe and having open and closed positions, control means for cyclically operating said valve mechanism alternately between its two positions, whereby the supply of air under superatmospheric pressure into said plenum chamber from said pipe is initiated by operation of said valve mechanism into its open position and is arrested by operation of said valve mechanism into its closed position, and whereby the air under superatmospheric pressure supplied into said plenum chamber penetrates said porous element and passes into said storage chamber and also fluidizes the adjacent portion of the pulverulent material in the bottom of said trough causing the fluidized pulverulent material to feed downwardly along said element into said sump, said valve mechanism being characterized by rapid operation from its closed position into its open position, whereby the supply of air under superatmospheric pressure from said pipe into said plenum chamber is initiated abruptly causing a high velocity shock wave to travel through said plenum chamber with the consequent vibration of said element and the resulting shaking of the adjacent portion of the pulverulent material in the bottom of said trough, a conduit, a valve device interconnecting said sump and said conduit and having open and closed positions, whereby the pulverulent material fed into said sump may be unloaded therefrom into said conduit via said valve device in its open position, and means for selectively operating said valve device between its two positions.

4. In combination, a container defining a fluid-tight storage chamber adapted to receive a pulverulent material, means accommodating the loading of the pulverulent material into said storage chamber, means defining a sump in the bottom of said container and communicating with said storage chamber, structure defining two elongated angularly spaced-apart troughs in the bottom of said container, each of said troughs having an open top communicating with said storage chamber, each of said troughs occupying an inclined position in the bottom of said container and extending from a lower position disposed adjacent to said sump to an upper position disposed remote from said sump, the lower ends of said troughs respectively communicating with said sump, two elongated porous elements respectively closing the bottoms of said troughs and respectively contacting the adjacent portions of the pulverulent material therein, said structure also defining two elongated plenum chambers respectively disposed below said troughs and respectively communicating with said elements, a pipe adapted to contain air under superatomspheric pressure, valve mechanism connecting said plenum chambers in parallel relation to said pipe and having open and closed positions, control means for cyclically operating said valve mechanism alternately between its two positions, whereby the supply of air under superatmospheric pressure into both of said plenum chambers from said pipe is initiated by operation of said valve mechanism into its open position and is arrested by operation of said valve mechanism into its closed position, and whereby the air under superatmospheric pressure supplied into each one of said plenum chambers penetrates the adjacent one of said porous elements and passes into said storage chamber and also fluidizes the adjacent portion of the pulverulent material in the bottom of the adjacent one of said troughs causing the fluidized pulverulent material to feed downwardly along the adjacent one of said elements into said sump, said valve mechanism being characterized by rapid operation from its closed position into its open position, whereby the supply of air under superatmospheric pressure from said pipe into each one of said plenum chambers is initiated abruptly causing a high velocity shock wave to travel through said one plenum chamber with the consequent vibration of the adjacent one of said elements and the resulting shaking of the adjacent portion of the pulverulent material in the bottom of the adjacent one of said troughs, and means for unloading to the exterior of said container the pulverulent material fed into said sump.

5. In combination, an elongated tubular container defining a fluid-tight storage chamber adapted to receive a pulverulent material, means accommodating the loading of the pulverulent material into said storage chamber, means defining a sump in the central bottom of said container and communicating with said storage chamber, structure defining two elongated angularly spaced-apart troughs in the bottom of said container, each of said troughs having an open top communicating with said storage chamber, each of said troughs occupying an inclined position in the bottom of said container and extending from a lower position disposed adjacent to said sump to an upper position disposed remote from said sump, the lower ends of said troughs respectively communicating with said sump and the upper ends of said troughs being respectively arranged adjacent to the opposite sides of said container at one end thereof, two elongated porous elements respectively closing the bottoms of said troughs and respectively contacting the adjacent portions of the pulverulent material therein, said structure also defining two elongated plenum chambers respectively disposed below said troughs and respectively communicating with said elements, a pipe adapted to contain air under superatmospheric pressure, valve mechanism connecting said plenum chambers in parallel relation to said pipe and having open and closed positions, control means for cyclically operating said valve mechanism alternately between its two positions, whereby the supply of air under superatmospheric pressure into both of said plenum chambers from said pipe is initiated by operation of said valve mechanism into its open position and is arrested by operation of said valve mechanism into its closed position, and whereby the air under superatmospheric pressure supplied into each one of said plenum chambers penetrates the adjacent one of said porous elements and passes into said storage chamber and also fluidizes the adjacent portion of the pulverulent material in the bottom of the adjacent one of said troughs causing the fluidized pulverulent material to feed downwardly along the adjacent one of said elements into said sump, said valve mechanism being characterized by rapid operation from its closed position into its open position, whereby the supply of air under superatmospheric pressure from said pipe into each one of said plenum chambers is initiated abruptly causing a high velocity shock wave to travel through said one plenum chamber with the consequent vibration of the adjacent one of said elements and the resulting shaking of the adjacent portion of the pulverulent material in the bottom of the adjacent one of said troughs, and means for unloading to the exterior of said container the pulverulent material fed into said sump.

6. In combination, a container defining a fluid-tight storage chamber adapted to receive a pulverulent material, means accommodating the loading of the pulverulent material into said storage chamber, means defining a sump in the bottom of said container and communicating with said storage chamber, structure defining two elongated angularly spaced-apart troughs in the bottom of said container, each of said troughs having an open top communicating with said storage chamber, each of said troughs occupying an inclined position in the bottom of said container and extending from a lower position disposed remote from said sump, the lower ends of said troughs respectively communicating with said sump, two elongated porous elements respectively closing the bottoms of said troughs and respectively contacting the adjacent portions of the pulverulent material therein, said structure also defining two elongated plenum chambers respectively disposed below said troughs and respectively communicating with said elements, a pipe adapted to contain air under superatmospheric pressure, valve mechanism having an inlet connected to said pipe and two outlets respectively connected to said plenum chambers, said valve mechanism having a first position connecting its inlet to a first of its outlets and disconnecting its inlet from a second of its outlets and having a second position connecting its inlet to its second outlet and disconnecting its inlet from its first outlet, control means for cyclically operating said valve mechanism alternately between its two positions, whereby operation of said valve mechanism into its first position initiates the supply of air under superatmospheric pressure from said pipe into said first plenum chamber and arrests the supply of air under superatmospheric pressure from said pipe into said second plenum chamber and operation of said valve mechanism into its second position initiates the supply of air under superatmospheric pressure from said pipe into said second plenum chamber and arrests the supply of air under superatmospheric pressure from said pipe into said first plenum chamber, and whereby the air under superatmospheric pressure supplied into each one of said plenum chambers penetrates the adjacent one of said porous elements and passes into said storage chamber and also fluidizes the adjacent portion of the pulverulent material in the bottom of the adjacent one of said troughs causing the fluidized pulverulent material to feed downwardly along the adjacent one of said elements into said sump, and means for unloading to the exterior of said container the pulverulent material fed into said sump.

7. In combination, a container defining a fluid-tight storage chamber adapted to receive a pulverulent material, means accommodating the loading of the pulverulent material into said storage chamber, means defining a sump in the bottom of said container and communicating with said storage chamber, structure defining two elongated angularly spaced-apart troughs in the bottom of said container, each of said troughs having an open top communicating with said storage chamber, each of said troughs occupying an inclined position in the bottom of said container and extending from a lower position disposed adjacent to said sump to an upper position disposed remote from said sump, the lower ends of said troughs respectively communicating with said sump, two elongated porous elements respectively closing the bottoms of said troughs and respectively contacting the adjacent portions of the pulverulent material therein, said structure also defining two elongated plenum chambers respectively disposed below said troughs and respectively communicating with said elements, a pipe adapted to contain air under superatmospheric pressure, valve mechanism having an inlet connected to said pipe and two outlets respectively connected to said plenum chambers, said valve mechanism having a first position connecting its inlet to a first of its outlets and disconnecting its inlet from a second of its outlets and having a second position connecting its inlet to its second outlet and disconnecting its inlet from its first outlet, control means for cyclically operating said valve mechanism alternately between its two positions, whereby operation of said valve mechanism into its first position initiates the supply of air under superatmospheric pressure from said pipe into said first plenum chamber and arrests the supply of air under superatmospheric pressure from said pipe into said second plenum chamber and operation of said valve mechanism into its second position initiates the supply of air under superatmospheric pressure from said pipe into said second plenum chamber and arrests the supply of air under superatmospheric pressure from said pipe into said first plenum chamber, and whereby the air under superatmospheric pressure supplied into each one of said plenum chambers penetrates the adjacent one of said porous elements and passes into said storage chamber and also fluidizes the adjacent portion of the pulverulent material in the bottom of the adjacent one of said troughs causing the fluidized pulverulent material to feed downwardly along the adjacent one of said elements into said sump, said valve mechanism being characterized by rapid operation from each one of its positions into the other of its positions, whereby the supply of air under superatmospheric pressure from said pipe into each one of said plenum chambers is both abruptly initiated and abruptly arrested causing corresponding rapid changes of the pressure of the air in said one plenum chamber with the consequent vibration of the adjacent one of said elements and the resulting shaking of the adjacent portion of the pulverulent material in the bottom of the adjacent one of said troughs, and means for unloading to the exterior of said container the pulverulent material fed into said sump.

8. In combination, an elongated tubular container defining a fluid-tight storage chamber adapted to receive a pulverulent material, means accommodating the loading of the pulverulent material into said storage chamber, means defining a sump in the central bottom of said container and communicating with said storage chamber, structure defining two elongated troughs respectively disposed in the bottom of the opposite end portions of said container, each of said troughs having an open top communicating with said storage chamber, each of said troughs occupying an inclined position in the corresponding bottom end portion of said container and extending from a lower position disposed adjacent to said sump to an upper position disposed remote from said sump, the lower ends of said troughs respectively communicating with said sump and the upper ends of said troughs being respectively arranged adjacent to the opposite ends of said container, two elongated porous elements respectively closing the bottoms of said troughs and respectively contacting the adjacent portions of the pulverulent material therein, said structure also defining two elongated plenum chambers respectively disposed below said troughs and respectively communicating with said elements, a pipe adapted to contain air under superatmospheric pressure, valve mechanism having an inlet connected to said pipe and two outlets respectively connected to said plenum chambers, said valve mechanism having a first position connecting its inlet to a first of its outlets and disconnecting its inlet from a second of its outlets and having a second position connecting its inlet to its second outlet and disconnecting its inlet from its first outlet, control means for cyclically operating said valve mechanism alternately between its two positions, whereby operation of said valve mechanism into its first position initiates the supply of air under superatmospheric pressure from said pipe into said first plenum chamber and arrests the supply of air under superatmospheric pressure from said pipe into said second plenum chamber and operation of said valve mechanism into its second position initiates the supply of air under superatmospheric pressure from said pipe into said second plenum chamber and arrests the supply of air under superatmospheric pressure from said pipe into said first plenum chamber, and whereby the air under superatmospheric pressure supplied into each one of said plenum chambers penetrates the adjacent one of said porous elements and passes into said storage chamber and also fluidizes the adjacent portion of the pulverulent material in the bottom of the adjacent one of said troughs causing the fluidized pulverulent material to feed downwardly along the adjacent one of said elements into said sump, and means for unloading to the exterior of said container the pulverulent material fed into said sump.

9. In combination, a container defining a fluid-tight storage chamber adapted to receive a pulverulent material, means accommodating the loading of the pulverulent material into said storage chamber, means defining a sump in the bottom of said container and communicating with said storage chamber, structure defining two elongated angularly spaced-apart troughs in the bottom of said container, each of said troughs having an open top communicating with said storage chamber, each of said troughs occupying an inclined position in the bottom of said container and extending from a lower position disposed adjacent to said sump to an upper position disposed remote from said sump, the lower ends of said troughs respectively communicating with said sump, two elongated porous elements respectively closing the bottoms of said troughs and respectively contacting the adjacent portions of the pulverulent material therein, said structure also defining two elongated plenum chambers respectively disposed below said troughs and respectively communicating with said elements, a source of air under superatmospheric pressure, a switching valve having an inlet connected to said air source and two outlets respectively connected to said plenum chambers, said switching valve having a first position connecting its inlet to a first of its outlets and disconnecting its inlet from a second of its outlets and having a second position connecting its inlet to its second outlet and disconnecting its inlet from its first outlet, whereby operation of said switching valve into its first position initiates the supply of air under superatmospheric pressure from said air source into said first plenum chamber and arrests the supply of air under superatomspheric pressure from said air source into said second plenum chamber and operation of said switching valve into its second position initiates the supply of air under superatmospheric pressure from said air source into said second plenum chamber and arrests the supply of air under superatmospheric pressure from said air source into said first plenum chamber, and whereby the air under superatmospheric pressure supplied into each one of said plenum chambers penetrates the adjacent one of said porous elements and passes into said storage chamber and also fluidizes the adjacent portion of the pulverulent material in the bottom of the adjacent one of said troughs causing the fluidized pulverulent material to feed downwardly along the adjacent one of said elements into said sump, an oscillating valve having an inlet connected to said air source and two outlets respectively connected to said switching valve, said oscillating valve having a first position connecting its inlet to a first of its outlets and disconnecting its inlet from a second of its outlets and having a second position connecting its inlet to its second outlet and disconnecting its inlet from its first outlet, said switching valve being operated into its first position in response to the supply of air thereto via the first outlet of said oscillating valve and being operated into its second position in response to the supply of air thereto via the second outlet of said oscillating valve, control means for cyclically operating said oscillating valve alternately between its two positions, and means for unloading to the exterior of said container the pulverulent material fed into said sump.

10. The combination set forth in claim 9, wherein said air source is under a pressure in the range from about 15 p.s.i.g. to about 45 p.s.i.g.

11. The combination set forth in claim 9, wherein said control means operates said oscillating valve alternately between its two positions at a frequency in the range from about 2 to about 20 cycles per minute.

12. In combination, a container defining a fluid-tight storage chamber adapted to receive a pulverulent material, means accommodating the loading of the pulverulent material into said storage chamber, means defining a sump in the bottom of said container and communicating with said storage chamber, structure defining two elongated angularly spaced-apart troughs in the bottom of said container, each of said troughs having an open top communicating with said storage chamber, each of said troughs occupying an inclined position in the bottom of said container and extending from a lower position disposed adjacent to said sump to an upper position disposed remote from said sump, the lower ends of said troughs respectively communicating with said sump, two elongated porous elements respectively closing the bottoms of said troughs and respectively contacting the adjacent portions of the pulverulent material therein, said structure also defining two elongated plenum chambers respectively disposed below said troughs and respectively communicating with said elements, a source of air under superatmospheric pressure, a switching valve having an inlet connected to said air source and two outlets respectively connected to said plenum chambers, said switching valve having a first position connecting its inlet to a first of its outlets and disconnecting its inlet from a second of its outlets and having a second position connecting its inlet to its second outlet and disconnecting its inlet from its first outlet, whereby operation of said switching valve into its first position initiates the supply of air under superatmospheric pressure from said air source into said first plenum chamber and arrests the supply of air under superatmospheric pressure from said air source into said second plenum chamber and operation of said switching valve into its second position initiates the supply of air under superatmospheric pressure from said air source into said second plenum chamber and arrests the supply of air under superatmospheric pressure from said air source into said first plenum chamber, and whereby the air under superatmospheric pressure supplied into each one of said plenum chambers penetrates the adjacent one of said porous elements and passes into said storage chamber and also fluidizes the adjacent portion of the pulverulent material in the bottom of the adjacent one of said troughs causing the fluidized pulverulent material to feed downwardly along the adjacent one of said elements into said sump, an oscillating valve having an inlet connected to said air source and two outlets respectively connected to said switching valve, said oscillating valve having a first position connecting its inlet to a first of its outlets and disconnecting its inlet from a second of its outlets and having a second position connecting its inlet to its second out and disconnecting its inlet from its first outlet, said switching valve being operated into its first position in response to the supply of air thereto via the first outlet of said oscillating valve and being operated into its second position in response to the supply of air thereto via the second outlet of said oscillating valve, control means for cyclically operating said oscillating valve alternately between its two positions, said switching valve being characterized by rapid operation from each one of its positions into the other of its positions, whereby the supply of air under superatmospheric pressure into each one of said plenum chambers is both abruptly initiated and abruptly arrested causing corresponding rapid changes of the pressure of the air in said one plenum chamber with the consequent vibration of the adjacent one of said elements and the resulting shaking of the adjacent portion of the pulverulent material in the bottom of the adjacent one of said troughs, and means for unloading to the exterior of said container the pulverulent material fed into said sump.

13. The combination set forth in claim 12, wherein said air source is under a pressure in the range from about 15 p.s.i.g. to about 45 p.s.i.g., and said control means operates said oscillating valve alternately between its two positions at a frequency in the range from about 2 to about 20 cycles per minute.

14. The combination set forth in claim 12, wherein each of said porous elements comprises a woven fabric structure.

15. In combination, a container defining a fluid-tight storage chamber adapted to receive a pulverulent material, means accommodating the loading of the pulverulent material into said storage chamber, means defining a sump in the bottom of said container and communicating with said storage chamber, means for feeding the pulverulent material in said storage chamber into said sump, a conduit for containing air under superatmospheric pressure and connected to said storage chamber, a discharge valve arranged below said container adjacent to said sump and comprising structure defining an entrainment chamber and an inlet passage from said sump into said entrainment chamber and an outlet passage from said entrainment chamber to the exterior, said discharge valve also including a valve element cooperating with said inlet passage and having open and closed positions with respect thereto, the weight of the pulverulent material in said sump and the pressure of the air in said storage chamber normally biasing said valve element into its open position, whereby the pulverulent material may pass from said sump through said inlet passage with said valve element in its open position into said entrainment chamber, a pipe connecting said storage chamber to said entrainment chamber, a valve device arranged in said pipe and having open and closed positions, whereby the air from said storage chamber may pass through said pipe with said valve device in its open position into said entrainment chamber so as to effect entrainment of the pulverulent material therein and may then blow through said outlet passage in order to effect pneumatic unloading of the pulverulent material from said storage chamber, a control device connected to said conduit and including a member having normal and control positions, said control device also including means responsive to a rapid rate of drop in the pressure of the air in said conduit for operating said member rapidly from a normal position into its control position, the air in said conduit being subject to a rapid rate of drop in pressure incident to unloading of substantially all of the pulverulent material from said storage chamber as a consequence of the initial rush of the air from said storage chamber through said inlet passage with said valve element in its open position, and means governed by rapid operation of said member into its control position for rapidly operating said valve element into its closed position so as to prevent rapid discharge of the air under substantial pressure from said storage chamber via said inlet passage and through said outlet passage incident to unloading of substantially all of the pulverulent material from said storage chamber.

16. In combination, a container defining a fluid-tight storage chamber adapted to receive a pulverulent material, means accommodating the loading of the pulverluent material into said storage chamber, means defining a sump in the bottom of said container and communicating with said storage chamber, means for feeding the pulverulent material in said storage chamber into said sump, a conduit containing air under superatmospheric pressure and connected to said storage chamber, a discharge valve arranged below said container adjacent to said sump and comprising structure defining an entrainment chamber and an inlet passage from said sump into said entrainment chamber and an outlet passage from said entrainment chamber to the exterior, said discharge valve also including a valve element cooperating with said inlet passage and having open and closed positions with respect thereto, the weight of the pulverulent material in said sump and the pressure of the air in said storage chamber normally biasing said valve element into its open position, whereby the pulverulent material may pass from said sump through said inlet passage with said valve element in its open position into said entrainment chamber, a pipe connecting said storage chamber to said entrainment chamber, a valve device arranged in said pipe and having open and closed positions, whereby the air from said storage chamber may pass through said pipe with said valve device in its open position into said entrainment chamber so as to effect entrainment of the pulverulent material therein and may then blow through said outlet passage in order to effect pneumatic unloading of the pulverulent material from said storage chamber, a control device connected to said conduit and including a member having normal and control positions, said control device also including means responsive to a rapid rate of drop in the pressure of the air in said conduit for operating said member rapidly from a normal position into its control position, the air in said conduit being subject to a rapid rate of drop in pressure incident to unloading of substantially all of the pulverulent material from said storage chamber as a consequence of the initial rush of the air from said storage chamber through said inlet passage with said valve element in its open position, said control device further including means responsive to operation of said member into control position for gradually returning said member back into its normal position, and means governed by the rapid operation of said member into its control position for rapidly operating said valve element into its closed position and governed by the gradual return of said member into its normal position for gradually operating said valve element into its open position, thereby to prevent rapid discharge of the air under substantial pressure from said storage chamber into said inlet passage incident to unloading of substantially all of the pulverulent material from said storage chamber and to accommodate subsequent throttling of the air under substantial pressure from said storage chamber into said inlet passage.

17. The combination set forth in claim 16, wherein said control device includes a casing having a diaphragm defining primary and secondary chambers, said member is connected to said diaphragm for movement therewith between the normal and control positions of said member, said primary chamber being connected to said conduit, a check valve interconnecting said primary and secondary chambers permitting flow of air from said primary to said secondary chamber to store air under superatmospheric pressure in said secondary chamber, and a needle valve interconnecting said primary and secondary chambers and permitting flow of air from said secondary chamber to said primary chamber upon the loss of pressure in said primary chamber gradually to return said member into its normal position for gradually operating said valve element into its open position.

18. In combination, a container defining a fluid-tight storage chamber adapted to receive a pulverulent material, means accommodating the loading of the pulverulent material into said storage chamber, means defining a sump in the bottom of said container and communicating with said storage chamber, structure defining two elongated angularly spaced-apart troughs in the bottom of said container, each of said troughs having an open top communicating with said storage chamber, each of said troughs occupying an inclined position in the bottom of said container and extending from a lower position disposed adjacent to said sump to an upper position disposed remote from said sump, the lower ends of said troughs respectively communicating with said sump, two elongated porous elements respectively closing the bottoms of said troughs and respectively contacting the adjacent portions of the pulverulent material therein, said structure also defining two elongated plenum chambers respectively disposed below said troughs and respectively communicating with said elements, a conduit for containing air under superatmospheric pressure and connected to said storage chamber, valve mechanism having an inlet connected to said conduit and two outlets respectively connected to said plenum chambers, said valve mechanism having a first position connecting its inlet to a first of its outlets and disconnecting its inlet from a second of its outlets and having a second position connecting its inlet to its second outlet and disconnecting its inlet from its first outlet, control means for cyclically operating said valve mechanism alternately between its two positions, whereby operation of said valve mechanism into its first position initiates the supply of air under superatmospheric pressure from said conduit into said first plenum chamber and arrests the supply of air under superatmospheric pressure from said conduit into said second plenum chamber and operation of said valve mechanism into its second position initiates the supply of air under superatmospheric pressure from said conduit into said second plenum chamber and arrests the supply of air under superatmospheric pressure from said conduit into said first plenum chamber, and whereby the air under superatmospheric pressure supplied into each one of said plenum chambers penetrates the adjacent one of said porous elements and passes into said storage chamber and also fluidizes the adjacent portion of the pulverulent material in the bottom of the adjacent one of said troughs causing the fluidized pulverulent material to feed downwardly along the adjacent one of said elements into said sump, a discharge valve arranged below said container adjacent to said sump and comprising structure defining an entrainment chamber and an inlet passage from said sump into said entrainment chamber and an outlet passage from said entrainment chamber to the exterior, said discharge valve also including a valve element cooperating with said inlet passage and having open and closed positions with respect thereto, the weight of the pulverulent material in said sump and the pressure of the air in said storage chamber normally biasing said valve element into its open position, whereby the pulverulent material may pass from said sump through said inlet passage with said valve element in its open position into said entrainment chamber, a pipe connecting said storage chamber to said entrainment chamber, a valve device arranged in said pipe and having open and closed positions, whereby the air from said storage chamber may pass through said pipe with said valve device in its open position into said entrainment chamber so as to effect entrainment of the pulverulent material therein and may then blow through said outlet passage in order to effect pneumatic unloading of the pulverulent material from said storage chamber, a control device connected to said conduit and including a member having normal and control positions, said control device also including means responsive to a rapid rate of drop in the pressure of the air in said conduit for operating said member rapidly from a normal position into its control position, the air in said conduit being subject to a rapid rate of drop in pressure incident to unloading of substantially all of the pulverulent material from said storage chamber as a consequence of the initial rush of the air from said storage chamber through said inlet passage with said valve element in its open position, and means governed by rapid operation of said member into its control position for rapidly operating said valve element into its closed position so as to prevent rapid discharge of the air under substantial pressure from said storage chamber via said inlet passage and through said outlet passage incident to unloading of substantially all of the pulverulent material from said storage chamber.

19. A vehicle comprising an elongated longitudinally extending tubular body shell defining a fluid-tight storage chamber adapted to receive a pulverulent material lading, means accommodating the loading of the pulverulent material into storage chamber, means defining a sump in the central bottom portion of said body shell and communicating with said storage chamber, structure defining two elongated longitudinally extending troughs respectively disposed in the bottoms of the opposite end portions of said body shell, each of said troughs having an open top communicating with said storage chamber, each of said troughs occupying an inclined position in the corresponding bottom end portion of said body shell and extending from a lower position disposed adjacent to said sump to an upper position disposed remote from said sump, the lower ends of said troughs respectively communicating with said sump and the upper ends of said troughs being respectively arranged adjacent to the opposite ends of said body shell, two elongated porous elements respectively closing the bottoms of said troughs and respectively contacting the adjacent portions of the pulverulent material therein, said structure also defining two elongated plenum chambers respectively disposed below said troughs and respectively communicating with said elements, a pipe adapted to contain air under superatmospheric pressure, valve mechanism having an inlet connected to said pipe and two outlets respectively connected to said plenum chambers, said valve mechanism having a first position connecting its inlet to a first of its outlets and disconnecting its inlet from a second of its outlets and having a second position connecting its inlet to its second outlet and disconnecting its inlet from its first outlet, control means for cyclically operating said valve mechanism alternately between its two positions, whereby operation of said valve mechanism into its first position initiates the supply of air under superatmospheric pressure from said pipe into said first plenum chamber and arrests the supply of air under superatmospheric pressure from said pipe into said second plenum chamber and operation of said valve mechanism into its second position initiates the supply of air under superatmospheric pressure from said pipe into said second plenum chamber and arrests the supply of air under superatmospheric pressure from said pipe into said first plenum chamber, and whereby the air under superatmospheric pressure supplied into each one of said plenum chambers penetrates the adjacent one of said porous elements and passes into said storage chamber and also fluidizes the adjacent portion of the pulverulent material in the bottom of the adjacent one of said troughs causing the fluidized pulverulent material to feed downwardly along the adjacent one of said elements into said sump, a laterally extending tube carried by the central bottom portion of said body shell and provided with open outer ends respectively disposed adjacent to the opposite sides of said body shell and readily accessible from the exterior, a pair of closure caps respectively removably carried by the opposite ends of said tube, a conduit connecting said storage chamber to said tube and allowing passage of air under superatmospheric pressure from said storage chamber to said tube, means providing a passage between the midsection of said tube and said sump, a valve device cooperating with said passage and selectively operative to open and to close the same, whereby the pulverulent material in said body shell may be unloaded therefrom through said sump and said passage into said tube with said valve device in its open position and then blown by the air under superatmospheric pressure through either open end of said tube with the corresponding one of said closure caps in its open condition, and means for selectively controlling operation of said valve device between its open and closed positions.

20. The vehicle set forth in claim 19, wherein said pipe extends below said body shell and between the opposite sides thereof, and further comprising a pair of air inlet fixtures respectively arranged on opposite sides of said body shell and communicating with said pipe, whereby air under superatmospheric pressure may be supplied from either side of body shell into the corresponding one of said air inlet fixtures and thus into said pipe.

21. The vehicle set forth in claim 19, wherein the two outlets of said valve mechanism are respectively connected to the lower ends of said plenum chambers and thus adjacent to said sump.

22. A vehicle comprising an elongated longitudinally extending tubular body shell defining a fluid-tight enclosure and adapted to receive a pulverulent material lading, means accommodating the loading of the pulverulent material into said body shell, means defining a sump in the central bottom portion of said body shell, means for feeding the pulverulent material in said body shell into said sump, means for supplying air under superatmospheric pressure into said body shell, a laterally extending tube arranged below the central bottom portion of said body shell and supported thereby, said tube being provided with open outer ends respectively disposed adjacent to the opposite sides of said body shell and readily accessible from the exterior, a pair of closure caps respectively removably carried by the opposite ends of said tube, a conduit connecting said storage chamber to said tube and allowing passage of air under superatmospheric pressure from said storage chamber to said tube, structure providing a passage between the midsection of said tube and said sump, a valve device arranged in the midsection of said tube and cooperating with said passage and selectively operative to open and to close the same, whereby the pulverulent material in sai dbody shell may be unloaded therefrom through said sump and said passage into the midsection of said tube with said valve device in its open position and then blown by the air under superatmospheric pressure through either open end of said tube with the corresponding one of said closure caps in its open condition, and means for selectively pneumatically controlling operation of said valve device between its open and closed positions.

23. A vehicle comprising an elongated longitudinally extending tubular body shell defining a fluid-tight storage chamber adapted to receive a pulverulent material lading, means accommodating the loading of the pulverulent material into said storage chamber, means defining a sump in the central bottom portion of said body shell and communicating with said storage chamber, means for feeding the pulverulent material in said storage chamber into said sump, a laterally extending tube carried by the central bottom portion of said body shell and provided with open outer ends respectively disposed adjacent to the opposite sides of said body shell and readily accessible from the exterior, structure providing a passage between said sump and the midsection of said tube, whereby the pulverulent material fed into said sump passes therefrom into the midsection of said tube, first and second shut-off valves respectively arranged in said tube on opposite sides of the midsection thereof and well inwardly from the adjacent outer ends thereof, means for selectively operating said shut-off valves between their open and closed positions, a pair of closure caps respectively removably carried by the opposite outer ends of said tube, means for supplying air under superatmospheric pressure into said storage chamber, a first pipe communicating between the top of said storage chamber and a first end portion of said tube disposed outwardly of the adjacent first of said shut-off valves, a second pipe communicating between the top of said storage chamber and a second end portion of said tube disposed outwardly of the adjacent second of said shut-off valves, first and second control valves respectively arranged in said first and second pipes, and means for selectively operating said control valves between their open and closed positions, said first control valve in its open position accommodating the flow of the air under superatmospheric pressure from said storage chamber via said first pipe through said tube in a first direction with said shut-off valves in their open positions and thence out of the other open end of said tube with the corresponding second of said closure caps in its open condition, said second control valve in its open position accommodating the flow of the air under superatmospheric pressure from said storage chamber via said second pipe through said tube in a second direction with said shut-off valves in their open positions and thence out of the one open end of said tube with the corresponding first of said closure caps in its open condition, the flow of the air under superatmospheric pressure through said tube in either direction affecting the flow therewith of the pulverulent material passing into the midsection of said tube, whereby the pulverulent material may be pneumatically unloaded from said storage chamber to the exterior through either desired open end of said tube.

24. The vehicle set forth in claim 23, wherein said means for selectively operating said control valves includes a pair of handle members carried by the central portion of said body section and respectively positioned adjacent to and exteriorly of the opposite sides of said body shell, whereby the operation of said valves may be manually selectively controlled from the sides of said body shell, and further comprising means interlocking said handle members so that actuation of either one of said handle members to operate the associated one of said control valves into its open position effects actuation of the other of said handle members to operate the associated other of said control valves into its closed position.

25. A vehicle comprising an elongated longitudinally extending tubular body shell defining a fluid-tight storage chamber adapted to receive a pulverulent material lading, means accommodating the loading of the pulverulent material into said storage chamber, means defining a sump in the central bottom portion of said body shell and communicating with said storage chamber, means for feeding the pulverulent material in said storage chamber into said sump, a laterally extending tube carried by the central bottom portion of said body shell and provided with open outer ends respectively disposed adjacent to the opposite sides of said body shell and readily accessible from the exterior, structure providing a passage between said sump and the midsection of said tube, whereby the pulverulent material fed into said sump passes therefrom into the midsection of said tube, a pair of closure caps respectively removably carried by the opposite outer ends of said tube, means for supplying air under superatmospheric pressure into said storage chamber, a conduit extending through said body shell in sealed relation therewith and provided with an upper end in communication with the upper portion of said storage chamber and a lower end disposed exteriorly of said storage chamber, a first pipe communicating between the lower end of said conduit and a first end portion of said tube, a second pipe communicating between the lower end of said conduit and a second end portion of said tube, first and second control valves respectively arranged in said first and second pipes, means for selectively operating said control valves between their open and closed positions, said first control valve in its open position accommodating the flow of the air under superatmospheric pressure from said storage chamber via said conduit and said first pipe through said tube in a first direction and thence out of the other open end of said tube with the corresponding second of said closure caps in its open condition, said second control valve in its open position accommodating the flow of the air under superatmospheric pressure from said storage chamber via said conduit and said second pipe through said tube in a second direction and thence out of the one open end of said tube with the corresponding first of said closure caps in its open condition, the flow of the air under superatmospheric pressure through said tube in either direction effecting the flow therewith of the pulverulent material passing into the midsection of said tube, whereby the pulverulent material may be pneumatically unloaded from said storage chamber to the exterior through either desired open end of said tube, and a valve device arranged in the upper end of said conduit and responsive to the pressure of the air in said storage chamber, said valve device being operated into its closed position in response to a given low pressure in said storage chamber and operated into its open position in response to a given high pressure in said storage chamber.

26. The vehicle set forth in claim 25, wherein said valve device is of the differential type including a diaphragm arranged in the top of said storage chamber with one side thereof subject to the pressure of the air within said storage chamber and with the other side thereof subject to the pressure of the atmosphere, whereby said diaphragm is moved between high and low positions in response to the differential pressure extended upon the opposite sides thereof, and a valve element operated into an open position in response to movement of said diaphragm into its high position and operated into a closed position in response to movement of said diaphragm into its low position.

27. A railway car comprising an elongated longitudinally extending tubular body shell defining a fluid-tight enclosure, said body shell being of self-supporting rigid construction including a substantially elliptical central section and a pair of substantially cylindrical end sections and a pair of transition sections respectively joining the opposite ends of said central section to the respectively adjacent inner ends of said end sections and a pair of end headers respectively joined to the outer ends of said end sections, the tops of said sections being disposed in a substantially horizontal upper plane and the bottom of said central section being disposed in a substantially horizontal lower plane and the bottoms of said end sections being disposed in a substantially horizontal intermediate plane and the bottoms of said transition sections extending upwardly from the opposite ends of said central section and disposed in two corresponding upwardly and oppositely inclined planes, whereby said body shell is of fish-belly configuration, a pair of longitudinally aligned stub draft sills respectively arranged below said end sections and the respectively adjacent outer end portions of said transition sections, said stub draft sills being respectively provided with open outer ends adapted respectively to receive a pair of draft gears, the outer ends of said stub draft sills respectively projecting outwardly beyond the adjacent ones of said end headers and the inner ends of said stub draft sills being respectively rigidly secured to the adjacent outer end portions of said transition sections, said body shell constituting the only connection between said stub draft sills for the transmission of the total draft force therebetween, means defining a sump in the bottom of said central section, first structure defining a first pair of angularly diverging troughs in the bottom of a first end portion of said body shell and extending upwardly and outwardly from said sump into the opposite sides of a first of said end sections, second structure defining a second pair of angularly diverging troughs in the bottom of a second end portion of said body shell and extending upwardly and outwardly from said sump into the opposite sides of a second of end sections, said structures defining thereabove a storage chamber in the upper portion of said enclosure and adapted to receive a pulverulent material lading, said troughs having open tops commonly communicating with the bottom of said storage chamber, whereby the pulverulent material in said storage chamber enters said troughs, means for feeding the pulverulent material along said troughs into said sump, and means for unloading to the exterior of said sump the pulverulent material accummulating therein.

28. A railway car comprising an elongated longitudinally extending tubular body shell defining a fluid-tight enclosure, said body shell being of self-supporting rigid construction including a substantially elliptical central section and a pair of substantially cylindrical end sections and a pair of transition sections respectively joining the opposite ends of said central section to the respectively adjacent inner ends of said end sections and a pair of end headers respectively joined to the outer ends of said end sections, the tops of said sections being disposed in a substantially horizontal upper plane and the bottom of said central section being disposed in a substantially horizontal lower plane and the bottoms of said end sections being disposed in a substantially horizontal intermediate plane and the bottoms of said transition sections extending upwardly from the opposite ends of said central section and disposed in two corresponding upwardly and oppositely inclined planes, whereby said body shell is of fish-belly configuration, a pair of longitudinally aligned stub draft sills respectively arranged below said end sections and the respectively adjacent outer end portions of said transition sections, said stub draft sills being respectively provided with open outer ends adapted respectively to receive a pair of draft gears, the outer ends of said stub draft sills respectively projecting outwardly beyond the adjacent ones of said end headers and the inner ends of said stub draft sills being respectively rigidly secured to the adjacent outer end portions of said transition sections, said body shell constituting the only connection between said stub draft sills for the transmission of the total draft force therebetween, means defining a sump in the bottom of said central section, first structure defining a first pair of angularly diverging troughs in the bottom of a first end portion of said body shell and extending upwardly and outwardly from said sump into the opposite sides of a first of said end sections, second structure defining a second pair of angularly diverging troughs in the bottom of a second end portion of said body shell and extending upwardly and outwardly from said sump into the opposite sides of a second of said end sections, said structures defining thereabove a storage chamber in the upper portion of said enclosure and adapted to receive a pulverulent material lading, said troughs having open tops commonly communicating with the bottom of said storage chamber, whereby the pulverulent material in said storage chamber enters said troughs, a first pair of elongated porous elements respectively closing the bottoms of said first pair of troughs and respectively contacting the adjacent portions of the pulverulent material therein, said first structure also defining a first pair of elongated plenum chambers respectively below said first troughs and respectively communicating with said first elements, a second pair of elongated porous elements respectively closing the bottoms of said second pair of troughs and respectively conatcting the adjacent portions of the pulverulent material therein, said second structure also defining a second pair of elongated plenum chambers respectively below said second troughs and respectively communicating with said second elements, means for supplying air under superatmospheric pressure into said plenum chambers, whereby the air under superatmospheric pressure supplied into each of said plenum chambers penetrates the adjacent one of said porous elements and passes into said storage chamber and also fluidizes the adjacent portion of the pulverulent material in the bottom of the adjacent one of said troughs causing the fluidized pulverulent material to feed downwardly along the adjacent one of said elements into said sump, and means for unloading to the exterior of said sump the pulverulent material accumulating therein.

29. A railway car comprising an elongated longitudinally extending tubular body shell defining a fluid-tight enclosure, means defining a sump in the bottom central portion of said body shell, first structure defining a first pair of angularly diverging troughs in the bottom of a first end portion of said body shell and extending upwardly and outwardly from said sump into the opposite sides of said first end portion adjacent to the extreme end thereof, second structure defining a second pair of angularly diverging troughs in the bottom of a second end portion of said body shell and extending upwardly and outwardly from said sump into the opposite sides of said second end portion adjacent to the extreme end thereof, said structures defining thereabove a storage chamber in the upper portion of said enclosure and adapted to receive a pulverulent material lading, said troughs having open tops commonly communicating with the bottom of said storage chamber, whereby the pulverulent material in said storage chamber enters said troughs, a first pair of elongated porous elements respectively closing the bottoms of said first pair of troughs and respectively contacting the adjacent portions of the pulverulent material therein, said first structure also defining a first pair of elongated plenum chambers respectively below said first troughs and respectively communicating with said first elements, a second pair of elongated porous elements respectively closing the bottoms of said second pair of troughs and respectively contacting the adjacent portions of the pulverulent material therein, said second structure also defining a second pair of elongated plenum chambers respectively below said second troughs and respectively communicating with said second elements, means for cyclically supplying alternately air under superatmospheric pressure first into said first plenum chambers in parallel relation and thence into said second plenum chambers in parallel relation, whereby the air under superatmospheric pressure supplied into each one of said plenum chambers penetrates the adjacent one of said porous elements and passes into said storage chamber and also fluidizes the adjacent portion of the pulverulent material in the bottom of the adjacent one of said troughs causing the fluidized pulverulent material to feed downwardly along the adjacent one of said elements into said sump, with the result that the pulverulent material is fed cyclically and alternately first along said first elements into said sump and thence along said second elements into said sump, and means for unloading to the exterior of said sump the pulverulent material accumulating therein.

30. In combination, a container defining therein a fluid-tight storage compartment for accommodating pulverulent lading therein under superatmospheric pressure, a conduit containing fluid under superatmospheric pressure and connected to said storage compartment, discharge valve apparatus connected to said container for discharging lading therefrom and movable between an open position and a closed position, a fluid-tight casing having a diaphragm therein cooperating therewith to define a primary chamber and a secondary chamber, coupling means in said casing permitting coupling of said primary chamber to said conduit for maintaining the pressure in said primary chamber substantially equal to the pressure in said conduit, a control valve in said casing having a fluid passage therethrough and an orifice providing communication between said fluid passage and said primary chamber, means coupling said fluid passage to said discharge valve apparatus for controlling the operation of said discharge valve apparatus between the open and closed positions thereof, a control member in said control valve and connected to said diaphragm for movement therewith and movable between a normal position when the fluid pressure in said secondary chamber is less than or equal to the fluid pressure in said primary chamber and a control position when the fluid pressure in said secondary chamber is greater than the fluid pressure in said primary chamber, said control member in the normal position thereof allowing fluid flow through said passage to maintain said discharge valve apparatus in the open position thereof and said control member in the control position thereof preventing fluid flow through said passage for maintaining said discharge valve apparatus in the closed position thereof, a check valve interconnecting said primary and secondary chambers and permitting gradual flow of fluid from said primary chamber to said secondary chamber, and a relief valve interconnecting said primary and secondary chambers and permitting gradual flow of fluid from said secondary chamber to said primary chamber, said check valve and said relief valve permitting gradual equalization of the pressures on the opposite sides of said diaphragm, whereby upon a rapid rate of pressure drop in said container a pressure differential is rapidly created between said primary and secondary chambers moving said diaphragm and carrying said control member into the control position thereof for closing said discharge valve apparatus whereupon said relief valve permits gradual equalization of the pressures in the primary and secondary chambers and gradual movement of said control member back to the normal position thereof for gradual opening of said discharge valve apparatus.

31. Control apparatus for connection to a source of fluid and responsive to rapid rates of change in the fluid pressure of the source, said apparatus comprising a fluid-tight casing having a diaphragm therein cooperating therewith to define a primary chamber and a secondary chamber, coupling means in said casing permitting coupling of said primary chamber to the fluid source for maintaining the pressure in said primary chamber substantially equal to the pressure of the fluid source, a control valve in said casing having a fluid passage therethrough, a control member in said control valve and connected to said diaphragm for movement therewith and movable between a normal position when the fluid pressure in said secondary chamber is less than or equal to the fluid pressure in said primary chamber and a control position when the fluid pressure in said secondary chamber is greater than the fluid pressure in said primary chamber, said control member in the normal position thereof allowing fluid flow through said passage and in the control position thereof preventing fluid flow through said passage, a check valve interconnecting said primary and secondary chambers and permitting flow of fluid from said primary chamber to said secondary chamber for maintaining the pressures in said primary and secondary chambers at substantially the same value, and a relief valve interconnecting said primary and secondary chambers and permitting gradual flow of fluid from said secondary chamber to said primary chamber for gradual equalization of the pressures on the opposite sides of said diaphragm in the event of a sudden drop in pressure in said primary chamber, whereby upon a rapid rate of pressure drop in the source a pressure differential is rapidly created between said primary and secondary chambers moving said diaphragm and carrying said control member into the control position thereof whereupon said relief valve permits gradual equalization of the pressures in the primary and secondary chambers and gradual movement of said control member back to the normal position thereof.

32. The control apparatus set forth in claim 31, wherein the volume of said secondary chamber exceeds the volume of said primary chamber.

33. The control apparatus set forth in claim 31, wherein said control valve has an orifice therein providing communication between said fluid passage and said primary chamber.

34. The control apparatus set forth in claim 31, wherein said check valve comprises means providing a path for fluid between said primary and secondary chambers, and a closure member resiliently urged into closing relationship with said path to prevent the flow of fluid therethrough, said closure member being movable out of closing relationship with said path when the fluid pressure in said primary chamber exceeds the fluid pressure in said secondary chamber thereby allowing the passage of fluid from said primary chamber to said secondary chamber for equalizing the pressures on the opposite sides of said membrane.

35. The control apparatus set forth in claim 31, wherein said relief valve comprises a needle valve including means providing a path for fluid between said primary and secondary chambers, valve seat means disposed in said path, and a conical valve member movable into engagement with said valve seat and adjustable to permit a controlled gradual flow of fluid from said secondary chamber to said primary chamber when the pressure in said secondary chamber exceeds the pressure in said primary chamber.

36. Control apparatus for connection to a source of fluid and responsive to rapid rates of change in the fluid pressure of the source, said apparatus comprising a fluid-tight casing having a diaphragm therein cooperating therewith to define a primary chamber and a secondary chamber, the volume of said secondary chamber exceeding the volume of said primary chamber, coupling means in said casing permitting coupling of said primary chamber to the fluid source for maintaining the pressure in said primary chamber substantially equal to the pressure of the fluid source, a valve housing integral with said casing and having a central chamber therein and first and second lateral openings providing communication between the central chamber and the exterior of said housing, an annular valve seat disposed in said central chamber between the lateral openings, a control member in said housing and connected to said diaphragm for movement therewith and movable between a normal position when the fluid pressure in said secondary chamber is less than or equal to the fluid pressure in said primary chamber and a control position when the fluid pressure in said secondary chamber is greater than the fluid pressure in said primary chamber, said control member in the normal position thereof being spaced from said valve seat to allow passage of air between the first and second lateral openings through said central chamber, said control member in the control position thereof engaging said valve seat to close said central chamber for arresting passage of air between the first and second openings, said valve housing having an orifice therein providing communication between said primary chamber and one of the lateral openings, a check valve interconnecting said primary and second chambers and permitting flow of fluid from said primary chamber to said secondary chamber, and a relief valve interconnecting said primary and secondary chambers and permitting gradual flow of fluid from said secondary chamber to said primary chamber for gradual equalization of the pressures on the opposite sides of said diaphragm in the event of a sudden drop in pressure in said primary chamber, whereby upon a rapid rate of pressure drop in the source a pressure differential is rapidly created between said primary and secondary chambers moving said diaphragm and carrying said control member into the control position thereof whereupon said relief valve permits gradual equalization of the pressures in the primary and secondary chambers and gradual movement of said control member back to the normal position thereof.

References Cited

UNITED STATES PATENTS

| | | | |
|---|---|---|---|
| 2,813,758 | 11/1957 | Sayre | 302—53 |
| 2,889,856 | 6/1959 | Magnuson | 302—28 |
| 3,379,478 | 4/1968 | Aller | 302—52 |
| 3,016,063 | 1/1962 | Hausmann | 302—28 |

ANDRES H. NIELSEN, Primary Examiner